US006253124B1

(12) United States Patent
Belbruno

(10) Patent No.: US 6,253,124 B1
(45) Date of Patent: Jun. 26, 2001

(54) LOW ENERGY METHOD FOR CHANGING THE INCLINATIONS OF ORBITING SATELLITES USING WEAK STABILITY BOUNDARIES AND A COMPUTER PROCESS FOR IMPLEMENTING SAME

(75) Inventor: Edward A. Belbruno, Princeton, NJ (US)

(73) Assignee: Galaxy Development, Van Nuys, CA (US)

( * ) Notice: Subject to any disclaimer, the term of this patent is extended or adjusted under 35 U.S.C. 154(b) by 0 days.

(21) Appl. No.: 09/306,793

(22) Filed: May 7, 1999

Related U.S. Application Data

(63) Continuation of application No. PCT/US98/08247, filed on Feb. 24, 1998, and a continuation of application No. PCT/US98/01924, filed on Feb. 4, 1998, and a continuation of application No. PCT/US98/05784, filed on Mar. 25, 1998.
(60) Provisional application No. 60/048,244, filed on Jun. 2, 1997, and provisional application No. 60/044,318, filed on Apr. 24, 1997.

(51) Int. Cl.$^7$ ................................ B64G 1/24; B64G 1/10
(52) U.S. Cl. ...................... 701/13; 701/226; 244/158 R
(58) Field of Search .................................. 701/13, 3, 226, 701/4; 244/158 R, 164, 167

(56) References Cited

U.S. PATENT DOCUMENTS

| T100,604 | 5/1981 | Crill et al. . |
| 3,532,298 | 10/1970 | Swet . |
| 3,676,581 | 7/1972 | Swet . |
| 4,288,051 | 9/1981 | Göschel . |
| 4,599,697 | 7/1986 | Chan et al. . |
| 4,618,112 | 10/1986 | Keigler . |
| 5,064,152 | 11/1991 | Maute . |

(List continued on next page.)

OTHER PUBLICATIONS

Graziani, F., Castronuovo, M.M., and Teofilatto, P. "Geostationary Orbits From Mid–Latitude Launch Sites Via Lunar Gravity Assist" An American Astronautical Society Publication reprinted from *Spaceflight Dynamics* 1993, vol. 84 (pp. 561–572).

International Preliminary Examination Report for PCT/US98/08247.

Belbruno et al., 1993 "Sun–Perturbed Earth–to–Moon Transfers with Ballistic Capture", *J. Guidance Control and Dynamics.*, vol. 16 (4), pp. 770–775.

(List continued on next page.)

*Primary Examiner*—Michael J. Zanelli
*Assistant Examiner*—E. M. Gibson
(74) *Attorney, Agent, or Firm*—Irah H. Donner; Hale and Dorr LLP

(57) ABSTRACT

When a satellite is orbiting the earth in an elliptic orbit, it has a certain inclination with respect to the earth's equator. The usual way to change the inclination is perform a maneuver by firing the rocket engines at the periapsis of the ellipse. This then forces the satellite into the desired inclination. There is a substantially more fuel efficient way to change the inclination. This is done by an indirect route by first doing a maneuver to bring the satellite to the moon on a BCT (Ballistic Capture Transfer). At the moon, the satellite is in the so called fuzzy boundary or weak stability boundary. A negligibly small maneuver can then bring it back to the earth on a reverse BCT to the desired earth inclination. Another maneuver puts it into the new ellipse at the earth. In the case of satellites launched from Vandenberg AFB into LEO in a circular orbit of an altitude of 700 km with an inclination of 34°, approximately 6 km/s is required to change the inclination to 90°. The previous flight time associated with this method was approximately 170 days. A modification of this method also achieves a significant savings and unexpected benefits in energy as measured by Delta-V, where the flight time is also substantially reduced to 88 or even 6 days.

22 Claims, 21 Drawing Sheets

U.S. PATENT DOCUMENTS

| | | |
|---|---|---|
| 5,067,672 | 11/1991 | Bouzat . |
| 5,120,008 | 6/1992 | Ramohalli . |
| 5,158,249 | 10/1992 | Uphoff . |
| 5,163,640 | 11/1992 | Altobelli . |
| 5,199,672 | 4/1993 | King et al. . |
| 5,421,540 | 6/1995 | Ting . |
| 5,433,726 | 7/1995 | Horstein et al. . |
| 5,452,869 | 9/1995 | Basuthakur et al. . |
| 5,506,780 | 4/1996 | Montenbruck et al. . |
| 5,507,454 | 4/1996 | Dulck . |
| 5,568,904 | 10/1996 | Brock et al. . |
| 5,595,360 | 1/1997 | Spitzer . |
| 5,681,011 | 10/1997 | Frazier . |
| 6,059,233 * | 5/2000 | Koppel et al. .................. 244/158 R |

OTHER PUBLICATIONS

E. Belbruno, 1994 "Ballistic Lunar Capture Transfers Using the Fuzzy Boundary and Solar Perturbations: A Survey", *J. Brit. Interplanetary Soc.*, vol. 47 (2), pp. 73–80.

Yamakawa et al., "On Earth–Moon Transfer Trafectory With Gravitational Capture", The Institute of Space and Astronautical Science., pp. 1–20, Aug. 1993.

Kawaguchi et al., 1995 "On Making Use of Lunar and Solar Gravity Assists in Lunar–A, Planet–B Missions", *Acta Astronautica.*, vol. 35 (9–10), pp. 633–642.

Cook et al., 1990 "Return to the Moon: The Lunar Observer Mission", *Jet Propulsion Laboratory, California Institute of Technology.*, pp. 232–245.

E. Belbruno, 1994 "The Dynamical Mechanism of Ballistic Lunar Capture Transfers In the Four–Body Problem FromThe Perspective of Invariant Manifolds and Hills Regions", *The Geometry Center; University of Minnesota.*, No. 270, pp. 1–24.

* cited by examiner

CURRENT AND PROJECTED UNMANNED LUNAR MISSIONS

| DATE | NO. LUNAR MISSIONS | TRANSFER | MISSION NAME | PURPOSE | COUNTRY | MASS (KG) | COST |
|---|---|---|---|---|---|---|---|
| 1991 | 1 | BCT | HITEN | RS | JAPAN | 200 | 100M |
| 92 | 0 | | | | | | |
| 93 | 1 | H | CLEMENTINE | RS | US | 200 | 50M |
| 94 | 0 | | | | | | |
| 95 | 0 | | | | | | |
| 96 | 0 | | | | | | |
| 97 | 1 | H | LUNAR PROSPECTOR | RS | US | 200 | 40M |
| 98 | 1 | BCT | LUNAR A | RS | JAPAN | 2000 | 400M |
| 99 | 1 | BCT | BLUE MOON | RS | US | 50 | 10M |
| 2000 | 2 | | CLEMENTINE2 | RS(H20) | US | 200 | 40M |
|  |  |  |  | RS(H20) | US | 400 | 80M |
| 1 | 2 | | | RS | | 400 | 80M |
|  |  |  |  | RS | | 400 | 80M |
| 2 | 2 | | | RS | | 400 | 80M |
|  |  |  |  | RS | | 400 | 80M |
| 3 | 2 | | | RS | | 600 | 120M |
|  |  |  |  | RS | | 600 | 120M |
| 4 | 2 | | | RS | | 600 | 120M |
|  |  |  |  | RS | | 600 | 120M |
| 5 | 2 | | | RS | | 600 | 120M |
|  |  |  |  | RS | | 600 | 120M |
| 6 | 2 | | | RS | | 600 | 120M |
|  |  |  |  | RS | | 600 | 120M |
| 7 | 2 | | | RS | | 600 | 120M |
|  |  |  |  | RS | | 600 | 120M |
| 8 | 2 | | | LB | | 22,500 | 4.5B |
| 9 | 2 | | | LB | | 22,500 | 4.5B |
| 10 | 4 | | | S | | 400 | 80M |
| 11 | 4 | | | S | | 400 | 80M |
| 12 | 4 | | | S | | 400 | 80M |
| 13 | 4 | | | S | | 400 | 80M |
| 14 | 6 | | | RS, S | | 600 | 120M |
| | | | | | | TOTAL | 11.608 B |

RULE - 200 KG TO THE MOON EQUIVALENT TO 40 M.
H=HOHMANN, BCT = BALLISTIC CAPTURE TRANSFER
RS= ROBOTIC SCIENCE, LB = LUNAR BASE, C = COMMERCIAL, S = SUPPLIES
LB = 1 HABITAT (40 TONS), 1 H20 CONVERTER (4 TONS), 1 DISH ANTENNAE ( .5 TONS),
M = MILLION, B=BILLION                                  1 ROVER, SUPPLIES (.5TONS)

FIG. 12 ial application number PCT/US98/08247, which in turn claims priority from U.S. provisional patent application serial No. 60/044,318 filed Apr. 24, 1997, U.S. provisional patent application serial No. 60/048,244, filed Jun. 2, 1997, and is a continuation of PCT patent application PCT/US98/01924, filed Feb. 4, 1998, and PCT patent application PCT/US98/05784, filed Mar. 25, 1998, all to inventor Edward A. Belbruno, and all of which are incorporated herein by reference, including all references cited therein.

LOW ENERGY METHOD FOR CHANGING THE INCLINATIONS OF ORBITING SATELLITES USING WEAK STABILITY BOUNDARIES AND A COMPUTER PROCESS FOR IMPLEMENTING SAME

RELATED APPLICATIONS

This patent application is a continuation application from International application number PCT/US98/08247, which in turn claims priority from U.S. provisional patent application serial No. 60/044,318 filed Apr. 24, 1997, U.S. provisional patent application serial No. 60/048,244, filed Jun. 2, 1997, and is a continuation of PCT patent application PCT/US98/01924, filed Feb. 4, 1998, and PCT patent application PCT/US98/05784, filed Mar. 25, 1998, all to inventor Edward A. Belbruno, and all of which are incorporated herein by reference, including all references cited therein.

This patent application is related to U.S. provisional patent application serial No. 60/041,465, filed Mar. 25, 1997, to inventor Edward A. Belbruno, and which is incorporated herein by reference, including all references cited therein.

BACKGROUND OF THE INVENTION

1. Field of the Invention

This invention relates in general to methods for space travel, and in particular, to methods for an object, such as a satellite, space craft, and the like, to change inclinations using, for example, weak stability boundaries (WSBs) to be placed in orbit around the earth, moon, and/or other planets.

2. Background of the Related Art

The study of motion of objects, including celestial objects, originated, in part, with Newtonian mechanics. During the eighteenth and nineteenth centuries, Newtonian mechanics, using a law of motion described by acceleration provided an orderly and useful framework to solve most of the celestial mechanical problems of interest for that time. In order to specify the initial state of a Newtonian system, the velocities and positions of each particle must be specified.

However, in the mid-nineteenth century, Hamilton recast the formulation of dynamical systems by introducing the so-called Hamiltonian function, H, which represents the total energy of the system expressed in terms of the position and momentum, which is a first-order differential equation description. This first order aspect of the Hamiltonian, which represents a universal formalism for modeling dynamical systems in physics, implies a determinism for classical systems, as well as a link to quantum mechanics.

By the early 1900s, Poincare understood that the classical Newtonian three-body problem gave rise to a complicated set of dynamics that was very sensitive to dependence on initial conditions, which today is referred to as "chaos theory." The origin of chaotic motion can be traced back to classical (Hamiltonian) mechanics which is the foundation of (modern) classical physics. In particular, it was nonintegrable Hamiltonian mechanics and the associated nonlinear problems which posed both the dilemma and ultimately the insight into the occurrence of randomness and unpredictability in apparently completely deterministic systems.

The advent of the computer provided the tools which were hitherto lacking to earlier researchers, such as Poincare, and which relegated the nonintegrable Hamiltonian mechanics from the mainstream of physics research. With the development of computational methodology combined with deep intuitive insights, the early 1960s gave rise to the formulation of the KAM theorem, named after A. N. Kolmogorov, V. 1. Arnold, and J. Moser, that provided the conditions for randomness and unpredictability for nearly nonintegrable Hamiltonian systems.

Within the framework of current thinking, almost synonymous with certain classes of nonlinear problems is the so-called chaotic behavior. Chaos is not just simply disorder, but rather an order without periodicity. An interesting and revealing aspect of chaotic behavior is that it can appear random when the generating algorithms are finite, as described by the so-called logistic equations.

Chaotic motion is important for astrophysical (orbital) problems in particular, simply because very often within generally chaotic domains, patterns of ordered motion can be interspersed with chaotic activity at smaller scales. Because of the scale characteristics, the key element is to achieve sufficiently high resolving power in the numerical computation in order to describe precisely the quantitative behavior that can reveal certain types of chaotic activity. Such precision is required because instead of the much more familiar spatial or temporal periodicity, a type of scale invariance manifests itself. This scale invariance, discovered by Feigenbaum for one-dimensional mappings, provided for the possibility of analyzing renormalization group considerations within chaotic transitions.

Insights into stochastic mechanics have also been derived from related developments in nonlinear analysis, such as the relationship between nonlinear dynamics and modern ergodic theory. For example, if time averages along a trajectory on an energy surface are equal to the ensemble averages over the entire energy surface, a system is said to be ergodic on its energy surface. In the case of classical systems, randomness is closely related to ergodicity. When characterizing attractors in dissipative systems, similarities to ergodic behavior are encountered.

An example of a system's inherent randomness is the work of E. N. Lorenz on thermal convection, which demonstrated that completely deterministic systems of three ordinary differential equations underwent irregular fluctuations. Such bounded, nonperiodic solutions which are unstable can introduce turbulence, and hence the appellation "chaos," which connotes the apparent random motion of some mappings. One test that can be used to distinguish chaos from true randomness is through invocation of algorithmic complexity; a random sequence of zeros and ones can only be reproduced by copying the entire sequence, i.e., periodicity is of no assistance.

The Hamiltonian formulation seeks to describe motion in terms of first-order equations of motion. The usefulness of the Hamiltonian viewpoint lies in providing a framework for the theoretical extensions into many physical models, foremost among which is celestial mechanics. Hamiltonian equations hold for both special and general relativity. Furthermore, within classical mechanics it forms the basis for further development, such as the familiar Hamilton-Jacobi method and, of even greater extension, the basis for perturbation methods. This latter aspect of Hamiltonian theory will provide a starting point for the analytical discussions to follow in this brief outline.

As already mentioned, the Hamiltonian formulation basically seeks to describe motion in terms of first-order equations of motion. Generally, the motion of an integrable Hamilton system with N degrees of freedom is periodic and confined to the N-torus as shown in FIG. 1. FIG. 1 depicts an integrable system with two degrees of freedom on a torus, and a closed orbit of a trajectory. The KAM tori are concentric versions of the single torus. Hamiltonian systems for which N=1 are all integrable, while the vast majority of systems with N greater than or equal to 2 become nonintegrable.

An integral of motion which makes it possible to reduce the order of a set of equations, is called the first integral. To integrate a set of differential equations of the order 2N, that same number of integrals are generally required, except in the case of the Hamiltonian equations of motion, where N integrals are sufficient. This also can be expressed in terms of the Liouville theorem, which states that any region of phase space must remain constant under any (integrable) Hamiltonian formalism. The phase space region can change its shape, but not its phase space volume. Therefore, for any conservative dynamical system, such as planetary motion or pendula that does not have an attracting point, the phase space must remain constant.

Another outcome of the Hamiltonian formulation, which started out as a formulation for regular motion, is the implication of the existence of irregular and chaotic trajectories. Poincare realized that nonintegrable, classical, three-body systems could lead to chaotic trajectories. Chaotic behavior is due neither to a large number of degrees of freedom nor to any initial numerical imprecision. Chaotic behavior arises from a nonlinearity in the Hamiltonian equations with initially close trajectories that separate exponentially fast into a bounded region of phase space. Since initial conditions can only be measured with a finite accuracy and the errors propagate at an exponential rate, the long range behavior of these systems cannot be predicted.

The effects of perturbations in establishing regions of nonintegrability can be described for a weak perturbation using the KAM theorem. The KAM theorem, originally stated by Kolmogorov, and rigorously proven by Arnold and Moser, analyzed perturbative solutions to the classical many-body problem. The KAM theorem states that provided the perturbation is small, the perturbation is confined to an N-torus except for a negligible set of initial conditions which may lead to a wandering motion on the energy surface. This wandering motion is chaotic, implying a great sensitivity to initial conditions.

The N-tori, in this case, are known as KAM surfaces. When observed as plane sections they are often called KAM curves as illustrated in FIG. 2. These surfaces and curves may be slightly distorted (perturbed). That is, for a sufficiently small conservative Hamiltonian perturbation, most of the nonresonant invariant tori will not vanish, but will undergo a slight deformation, such that in the perturbed system phase space there are also invariant tori, filled by phase curves, which are conditionally periodic.

FIG. 2 illustrates a set of KAM invariant tori on the surface of which lie as elliptic integrable solutions. The nonintegrable solutions, irregular paths, which are hyperbolic in nature lie in between the invariant tori in so-called resonant zones, which are also sometimes referred to as stochastic zones.

The KAM results were extended through the results of J. Mather. KAM theory treats motions and related orbits that are very close to being well behaved and stable. Since KAM theory is basically a perturbation analysis, by its very nature the perturbation constant must be very small. Strong departures from the original operator through the perturbation parameter will invalidate the use of the original eigenfunctions used to generate the set of perturbed eigenfunctions. Mather's work analyzes unstable motions which are far from being well behaved. The perturbation can be relatively strong, and entirely new eigenfunctions (solutions) can be generated.

The practical importance of Mather's work for planetary orbit, escape, and capture is that the dynamics are applicable to those regions in phase space (i.e., Mather regions) associated with three- and four-body problems. Mather proved that for chaotic regions in lower (two) dimensions for any conservative Hamiltonian System, there exists or remains elliptical orbits which are unstable. In terms of NEO (near-Earth object) issues, KAM and Mather regions are important for describing both the orbital motions of comets, as well as for planning fuel conserving ballistic (flyby, rendezvous, and interception) trajectories to comets and other NEOs. The above discussion is a summary of the article by John L. Remo, entitled "NEO Orbits and Nonlinear Dynamics: A Brief Overview and Interpretations," 822 Annals of the New York Academy of Sciences 176–194 (1997), incorporated herein by reference, including the references cited therein.

Since the first lunar missions in the 1960s, the moon has been the object of interest of both scientific research and potential commercial development. During the 1980s, several lunar missions were launched by national space agencies. Interest in the moon is increasing with the advent of the multi-national space station making it possible to stage lunar missions from low earth orbit. However, continued interest in the moon and the feasibility of a lunar base will depend, in part, on the ability to schedule frequent and economical lunar missions.

A typical lunar mission comprises the following steps. Initially, a spacecraft is launched from earth or low earth orbit with sufficient impulse per unit mass, or change in velocity, to place the spacecraft into an earth-to-moon orbit. Generally, this orbit is a substantially elliptic earth-relative orbit having an apogee selected to nearly match the radius of the moon's earth-relative orbit.

As the spacecraft approaches the moon, a change in velocity is provided to transfer the spacecraft from the earth-to-moon orbit to a moon-relative orbit. An additional change in velocity may then be provided to transfer the spacecraft from the moon-relative orbit to the moon's surface if a moon landing is planned. When a return trip to the earth is desired, another change in velocity is provided which is sufficient to insert the spacecraft into a moon-to-earth orbit, for example, an orbit similar to the earth-to-moon orbit. Finally, as the spacecraft approaches the earth, a change in velocity is required to transfer the spacecraft from the moon-to-earth orbit to a low earth orbit or an earth return trajectory.

FIG. 3 is an illustration of an orbital system in accordance with a conventional lunar mission in a non-rotating coordinate system wherein the X-axis 10 and Y-axis 12 lay in the plane defined by the moon's earth-relative orbit 36, and the Z-axis 18 is normal thereto. In a typical lunar mission, a spacecraft is launched from earth 16 or low earth orbit 20, not necessarily circular, and provided with sufficient velocity to place the spacecraft into an earth-to-moon orbit 22.

Near the moon 14, a change in velocity is provided to reduce the spacecraft's moon-relative energy and transfer the spacecraft into a moon-relative orbit 24 which is not necessarily circular. An additional change in velocity is then provided to transfer the spacecraft from the moon-relative orbit 24 to the moon 14 by way of the moon landing trajectory 25. When an earth-return is desired, a change in velocity sufficient to place the spacecraft into a moon-to-earth orbit 26 is provided either directly from the moon's surface or through multiple impulses as in the descent. Finally, near the earth 16, a change in velocity is provided to reduce the spacecraft's earth-relative energy and return the spacecraft to low earth orbit 20 or to earth 16 via the earth-return trajectory 27.

FIG. 4 is an illustration of another conventional orbital system, described in U.S. Pat. No. 5,158,249 to Uphoff, incorporated herein by reference, including the references cited therein. The orbital system 28 comprises a plurality of earth-relative orbits, where transfer therebetween is accomplished by using the moon's gravitational field. The moon's gravitation field is used by targeting, through relatively small mid-orbit changes in velocity, for lunar swing by conditions which yield the desired orbit.

Although the earth-relative orbits in the orbital system 28 may be selected so that they all have the same Jacobian constant, thus indicating that the transfers therebetween can be achieved with no propellant-supplied change in velocity in the nominal case, relatively small propellant-supplied changes in velocity may be required. Propellant-supplied changes in velocity may be required to correct for targeting errors at previous lunar swingbys, to choose between alternative orbits achievable at a given swingby, and to account for changes in Jacobian constant due to the eccentricity of the moon's earth-relative orbit 36.

In FIG. 4, a spacecraft is launched from earth 16 or low earth orbit into an earth-to-moon orbit 22. The earth-to-moon orbit 22 may comprise, for example, a near minimal energy earth-to-moon trajectory, for example, an orbit having an apogee distance that nearly matches the moon's earth-relative orbit 36 radius. The spacecraft encounters the moon's sphere of gravitational influence 30 and uses the moon's gravitational field to transfer to a first earth-relative orbit 32.

The first earth-relative orbit 32 comprises, for example, approximately one-half revolution of a substantially one lunar month near circular orbit which has a semi-major axis and eccentricity substantially the same as the moon's earth-relative orbit 36, which is inclined approximately 46.3 degrees relative to the plane defined by the moon's earth-relative orbit 36, and which originates and terminates within the moon's sphere of influence 30. Because the first earth-relative orbit 32 and a typical near minimum energy earth-to-moon orbit 22 have the same Jacobian constant, the transfer can be accomplished by using the moon's gravitational field.

FIG. 5 is an illustration of another orbital system where, for example, satellites orbit the earth. A central station SC is situated at the center of a spherical triangle-shaped covering zone Z. Two geosynchronous satellites S-A and S-B have elliptical orbits with identical parameters. These parameters may be, for example, the following:

apogee situated at about 50,543.4 km, perigee situated at about 21,028.6 km, meniscal axis of 42,164 km, inclination of 63 degrees, perigee argument 270, orbit excentricity 0.35.

Each satellite includes an antenna or antennae 11 and 11$a$; each antenna is orientated towards the central station throughout the period when the satellite moves above the covering zone. The central station includes one connection station and one control station. FIG. 5 also shows a mobile unit M (which is situated inside zone Z, but which is shown above the latter for the sake of more clarity). This mobile unit is equipped with an antenna 14$a$ whose axis continuously points substantially towards the zenith.

In order to station such satellites, a large number of strategies are possible. One exemplary strategy is described with reference to FIG. 6. This strategy uses the ARIANE IV rocket and requires three pulses. At the time of launching, the satellite is accompanied by an ordinary geostationary satellite. The two satellites are placed on the standard transfer orbit of the ARIANE IV rocket, this orbit being situated within a quasi-equatorial plane (inclination of 7 degrees) with a perigee at 200 km, an apogee at 35,975 km and a perigee argument of 178 degrees. The orbit is marked as OST on FIG. 6.

Close to the perigee, a satellite rocket is ignited for a first pulse suitable for raising the apogee to 98,000 km, the orbit remaining within the same plane, orbit 01. This pulse may be broken down into two or three pulses. Close to the apogee of the orbit 01, a new pulse is sent to the satellite to change the plane of its orbit. The inclination of this plane is close to that of the plane of the definitive orbit, namely 63 degrees. This thrust is the largest and may be broken down into two or three thrusts. The orbit then becomes 02.

Finally, at an appropriate point of this orbit, a third thrust is sent to the satellite so as to provide it with a definitive orbit. If this strategy is satisfactory in certain respects, it nevertheless does constitute a drawback. In fact, it requires that the orbital plane be tilted when passing from the orbit 01 to the orbit 02, this resulting in a considerable consumption of propellant.

FIG. 7 is an illustration of another conventional lunar gravitational assistance transfer principle. In FIG. 7, the satellite is firstly transferred onto a standard orbit 01 situated inside a quasi-equatorial plane, which, in practice, is the orbit OST of FIG. 6, known as a Geostationary Transfer Orbit (GTO) orbit. At T1, the satellite is transferred onto a circumlunar orbit 02, still situated in the quasi-equatorial plane.

In practice, an extremely elliptic orbit is selected whose major axis is close to twice the Earth/Moon distance, namely about 768,800 km. The satellite penetrates into the sphere of influence SI of the moon and leaves this sphere on a trajectory 03 whose plane is highly inclined with respect to the equatorial plane. At T2, the satellite is injected onto the definitive orbit 04 inside the same plane as the orbit 03. The above described orbital system is described in detail in U.S. Pat. No. 5,507,454 to Dulck, incorporated herein by reference, including the references cited therein.

Dulck attempts to minimize the thrusters needed, where the standard technique of lunar gravity assist is used. The satellite is first brought to a neighborhood of the moon by a Hohmann transfer. It then flies by the moon in just the right directions and velocities, where it is broken up into two or more maneuvers. This method works, but the size of this maneuver restricts the applications of the method to ellipses whose eccentricities are sufficiently large. This is because to have a savings with this large maneuver, the final maneuver needs to be sufficiently small.

I have determined that all of the above orbital systems and/or methods suffer from the requirement of substantial fuel expenditure for maneuvers, and are therefore, not sufficiently efficient. I have also determined that the above methods focus on orbital systems that concentrate on the relationship between the earth and the moon, and do not consider possible effects and/or uses beyond this two-body problem.

Accordingly, it is desirable to provide an orbital system and/or method that furnishes efficient use of fuel or propellant. It is also desirable to provide an orbital system and/or method that it not substantially dependent on significant thrusting or propelling forces.

It is also desirable to provide an orbital system and/or method that considers the effects of lunar capture and/or earth capture as more than merely a two body problem. It is also desirable to provide an orbital system and/or method that may be implemented on a computer system that is either onboard the spacecraft or satellite, or located in a central controlling area.

It is also desirable to provide an orbital system and/or method that allows a spacecraft to make repeated close approaches to both the earth and moon. It is also desirable to provide an orbital system and/or method that is sustainable with relatively low propellant requirements, thereby providing an efficient method for cislunar travel.

It is also desirable to provide an orbital system and/or method that does not require large propellant supplied changes in velocity. It is also desirable to provide an orbital system and/or method that renders practical massive spacecraft components. It is also desirable to provide an orbital system and/or method that may be used for manned and unmanned missions.

It is also desirable to provide an orbital system and/or method that allows a spacecraft or satellite to make repeated close approaches at various inclinations to both the earth and moon.

It is also desirable to provide an orbital system and/or method that allows a spacecraft or satellite to make inclination changes with respect to, for example, the earth and/or moon.

SUMMARY OF THE INVENTION

It is a feature and advantage of the present invention to provide an orbital system and/or method that furnishes efficient use of fuel or propellant. It is another feature and advantage of the present invention to provide an orbital system and/or method that it not substantially dependent on significant thrusting or propelling forces.

It is another feature and advantage of the present invention to provide an orbital system and/or method that considers the effects of lunar capture and/or earth capture as more than merely a two body problem.

It is another feature and advantage of the present invention to provide an orbital system and/or method that may be implemented on a computer system that is either onboard the spacecraft or satellite, or located in a central controlling area. It is another feature and advantage of the present invention to provide an orbital system and/or method that allows a spacecraft to make repeated close approaches to both the earth and moon.

It is another feature and advantage of the present invention to provide an orbital system and/or method that is sustainable with relatively low propellant requirements, thereby providing an efficient method for cislunar travel.

It is another feature and advantage of the present invention to provide an orbital system and/or method that does not require large propellant supplied changes in velocity.

It is another feature and advantage of the present invention to provide an orbital system and/or method that renders practical massive spacecraft components.

It is another feature and advantage of the present invention to provide an orbital system and/or method that may be used for manned and unmanned missions.

It is another feature and advantage of the present invention to provide an orbital system and/or method that allows a spacecraft or satellite to make repeated close approaches at various inclinations to both the earth and moon.

It is another feature and advantage of the present invention to provide an orbital system and/or method that allows a spacecraft or satellite to make inclination changes with respect to, for example, the earth and/or moon.

The present invention comprises a system and/or method for cislunar travel which substantially reduces the propellant requirements for lunar missions. The present invention also provides orbital systems useful for earth-to-moon and moon-to-earth travel, which do not directly utilize the moon's gravitational field to achieve orbital transfers and can be sustained with relatively low propellant requirements. The present invention further provides frequent earth return possibilities for equipment and personnel on the moon, or in a moon-relative orbit. The present invention also provides orbital systems useful for earth-to-moon, earth-to-earth orbit, moon-to-earth/earth orbit, and/or interplanetary travel, which utilize weak stability boundaries for orbit entry and/or inclination changes to achieve orbital transfers and can be sustained with relatively low propellant requirements.

The present invention is based, in part, on my discovery that the conventional methods and/or orbital systems that concentrate or revolve around the relationship between the earth and the moon, and do not consider possible effects and/or uses beyond this two-body problem. More specifically, I have determined a new method and system that considers orbital capture, lunar travel and/or capture at least a three-body problem. This at least three-body problem includes the inter-relationship between the earth, moon and sun, including the inter-relationship of gravitational forces related thereto.

In accordance with one embodiment of the invention, a method generates an operational ballistic capture transfer for an object emanating substantially at earth or earth orbit to arrive at the moon or moon orbit using a computer implemented process. The method includes the steps of entering parameters including velocity magnitude $V_E$, flight path angle $\gamma_E$, and implementing a forward targeting process by varying the velocity magnitude $V_E$, and the flight path angle $\gamma_E$ for convergence of target variables at the moon. The target variables include radial distance, $r_M$, and inclination $i_M$. The method also includes the step of iterating the forward targeting process until sufficient convergence to obtain the operational ballistic capture transfer from the earth or the earth orbit to the moon or the moon orbit.

In accordance with another embodiment of the invention, a method of changing at least one of an inclination and an altitude of an object including at least one of a space vehicle, satellite and rocket is provided. The method includes the sequential or non-sequential steps of traveling from the earth or the earth orbit to a weak lunar capture in the WSB or the WSB orbit, and performing a negligible maneuver and optionally performing an inclination change at the WSB or the WSB orbit for ejection therefrom. The method also includes the step of traveling from the WSB or the WSB orbit to the earth or the earth orbit at a predetermined arbitrary altitude and optionally at the inclination change.

According to another embodiment of the invention, a method of changing at least one of an inclination and an altitude of an object including at least one of a space vehicle, satellite and rocket is provided. The method includes the sequential or non-sequential steps of traveling from the earth or the earth orbit to a weak lunar capture in the WSB or the WSB orbit, and maneuvering around the moon by performing a first negligible maneuver at the WSB or the WSB orbit. The method also includes the steps of optionally performing an inclination change at the WSB or the WSB orbit, ejecting from the WSB or the WSB orbit by performing a second negligible maneuver, and traveling from the WSB or the WSB orbit to the earth or the earth orbit at a predetermined arbitrary altitude and optionally at the inclination change.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 12 is an illustration of a summary of various lunar missions;

NOTATIONS AND NOMENCLATURE

Figure 1:
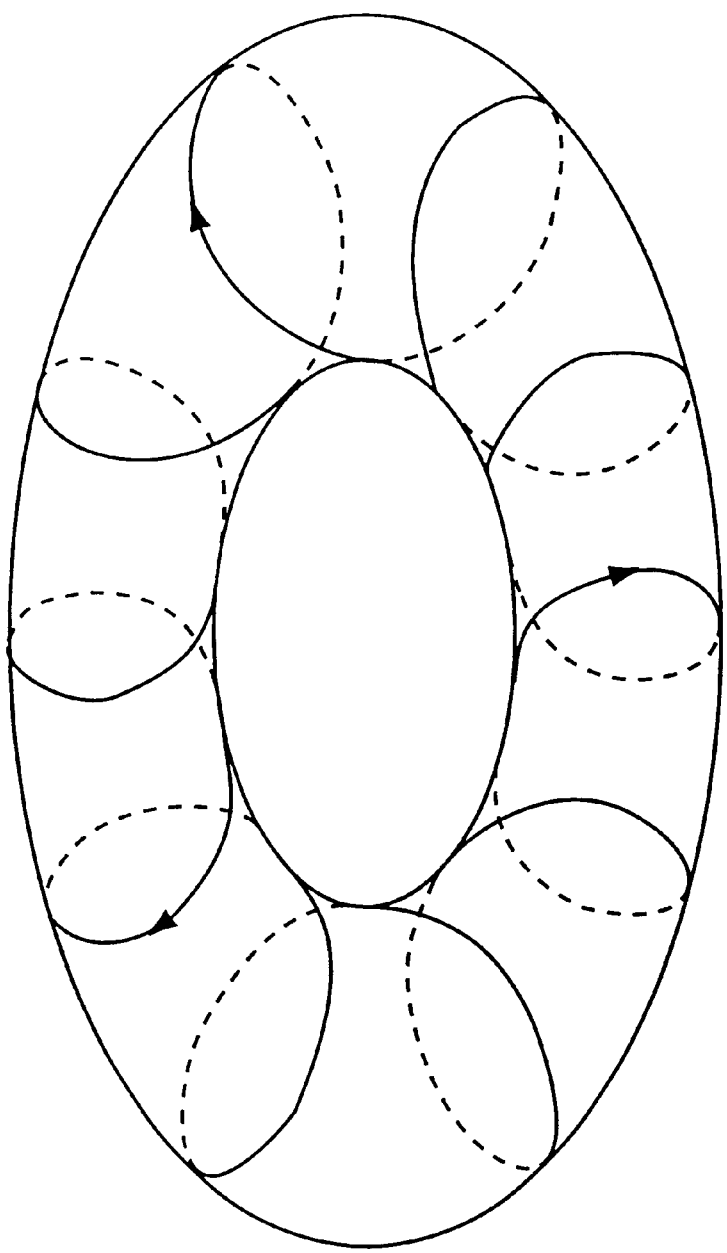
FIG. 1 depicts an integrable system with two degrees of freedom on a torus, and a closed orbit of a trajectory.
Figure 2:
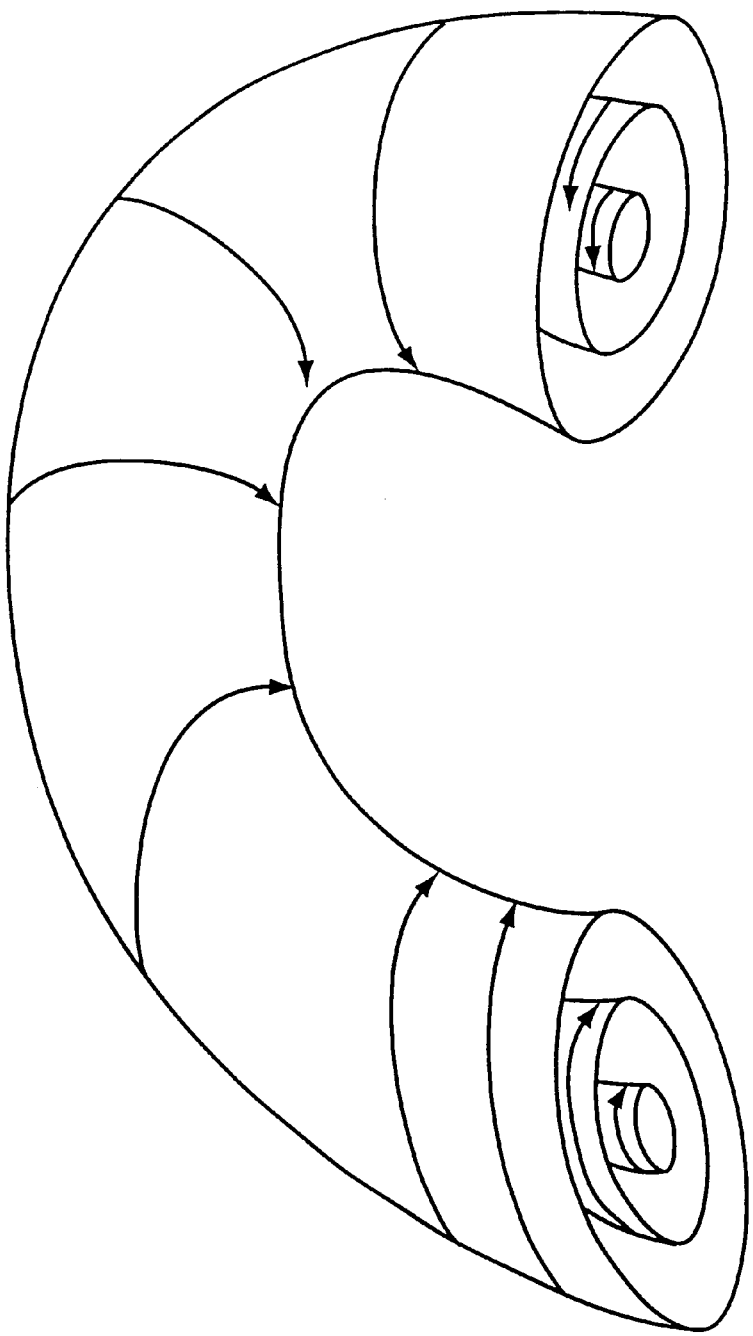
FIG. 2 illustrates a set of KAM invariant tori on the surface of which lie as elliptic integrable solutions.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENTS OF THE INVENTION

When a rocket travels from the earth to the moon on a classical direct route taking only three days called a Hohmann transfer, it must fire its engines in order to slow down to achieve lunar orbit. Otherwise, the rocket will overfly the moon at about 1 km/s.

A typical lunar mission comprises the following steps. Initially, a spacecraft is launched from earth or low earth orbit with sufficient impulse per unit mass, or change in velocity, to place the spacecraft into an earth-to-moon orbit. Generally, this orbit is a substantially elliptic earth-relative orbit having an apogee selected to nearly match the radius of the moon's earth-relative orbit.

As the spacecraft approaches the moon, a change in velocity is provided to transfer the spacecraft from the earth-to-moon orbit to a moon-relative orbit. An additional change in velocity may then be provided to transfer the spacecraft from the moon-relative orbit to the moon's surface if a moon landing is planned. When a return trip to the earth is desired, another change in velocity is provided which is sufficient to insert the spacecraft into a moon-to-earth orbit, for example, an orbit similar to the earth-to-moon orbit. Finally, as the spacecraft approaches the earth, a change in velocity is required to transfer the spacecraft from the moon-to-earth orbit to a low earth orbit or an earth return trajectory.

The propellant required at each step above depends on the mass of the spacecraft and the change of velocity required to effect the orbital transfer. The change in velocity at each step is generally provided by burning propellant. A mass of propellant is thereby expelled from the spacecraft at a large spacecraft-relative velocity, and the remaining spacecraft mass changes velocity reactively.

As a practical matter, because the orbital transfers in prior art lunar missions are achieved by burning propellant, the number and magnitude of orbital transfers which can be performed in a lunar mission are highly sensitive to the mass of the spacecraft.

It had been always assumed that it was not realistically possible to be captured at the moon without requiring slowing down using the engines. The present invention comprises a system and/or method for cislunar travel which substantially reduces the propellant requirements for lunar missions. The present invention also provides orbital systems useful for earth-to-moon and moon-to-earth travel, which do not directly utilize the moon's gravitational field to achieve orbital transfers and can be sustained with relatively low propellant requirements.

The present invention further provides frequent earth return possibilities for equipment and personnel on the moon, or in a moon-relative orbit. The present invention further provides orbital systems useful for earth-to-moon, earth-to-earth orbit, moon-to-earth/earth orbit, and/or interplanetary travel, which utilize weak stability boundaries for orbit entry and/or inclination changes to achieve orbital transfers and can be sustained with relatively low propellant requirements.

When a spacecraft arrives at the Moon from a Hohmann transfer, it has a hyperbolic excess velocity of approximately 1 km/s. Thus, to be captured into an elliptic lunar orbit, the spacecraft, S/C, must be slowed by the use of the propulsion system. The amount of propellant to do this can be significant and, moreover, there is a relatively short period of time for the braking maneuver to accomplish the lunar capture. The ability to achieve capture, that is for a S/C to have an elliptic orbital state with respect to the Moon at lunar periapsis, without the use of braking rockets is called ballistic capture.

Belbruno first found a way to do this in 1986 for an electric propulsion spacecraft mission study called LGAS (Lunar Get Away Special), Belbruno, E., Lunar Capture Orbits, a Method of Constructing Earth-Moon Trajectories and the Lunar GAS Mission, AIAA Paper no. 97–1054, Proceedings of AIAA/DGLR/JSASS Inter. Elec. Propl. Conf., May 1987, incorporated herein by reference including the references cited therein. This was accomplished realizing that in order for ballistic capture to occur, the S/C must arrive at the Moon in a weakly captured state. That is, the S/C must have a velocity at the desired capture radius where it is balancing between capture and escape. A region can be estimated about the Moon where this occurs, and it is called the Weak Stability Boundary (WSB) or the Fuzzy Boundary, Belbruno, E., Lunar Capture Orbits, a Method of Constructing Earth-Moon Trajectories and the Lunar GAS Mission, AIAA Paper no. 97–1054, Proceedings of AIAA/ DGLR/JSASS Inter. Elec. Propl. Conf., May 1987; Belbruno, E., Example of the Nonlinear Dynamics of Ballistic Capture and Escape in the Earth-Moon System, AIAA Paper No. 90–2896, Proceedings of the Annual AIAA Astrodynamics Conference, August 1990; Belbruno, E.; Miller, J., Sun-Perturbed Earth-to-Moon Transfers with Ballistic Capture, Journal of Guidance, Control, and dynamics, V. 16, No. 4, July–August 1993. pp 770–775; Belbruno, E., Ballistic Lunar Capture Transfers using the Fuzzy Boundary and Solar Perturbations: A Survey, Journal of the British Interplanetary Society, v. 47, Jan. 1994, pp 73–80; Belbruno, E., The Dynamical Mechanism of Ballistic Lunar Capture Transfers in The Four-Body Problem From The Perspective of Invariant Manifolds and Hill's Regions, Centre De Recreca Matematica (CRM) Preprint n. 270, December 1994, all of which are hereby incorporated by reference including the references cited therein.

Once the WSB is estimated, the problem of ballistic capture reduces to the problem of reaching this region (i.e. arrive at the Moon at the desired altitude with the correct velocity). Because the WSB lies between capture and escape, the S/C does not have a well defined central body—the Earth or the Moon. Thus its motion is quite sensitive. Because of this, it seemed at the time that a forward Newton targeting search to this region from near the Earth would not be successful. This indeed seemed to be true.

It was solved by the backwards method, suggested by D. Byrnes in 1986. This has been used to find precision BCT's for actual missions and mission studies ever since starting with LGAS, then Hiten in 1990, Lunar Observer in 1990, the planned Lunar-A, and, until late 1996, Blue Moon. See, e.g., Yamakawa, H.; Kawaguchi, J.; Ishii, N.; Matsuo, H., On Earth-Moon Transfer Trajectory with Gravitational Capture, Proceedings AAS/AIAA Astrodynamics Sp. Conf., Paper No. AAS 93-633, August 1993; Kawaguchi, J.; Yamakowa, H.; Uesugi, T.; Matsuo, H., On Making Use of Lunar and Solar Gravity Assists in Lunar-A, Planet-B Missions, Acta. Astr., V. 35, pp 633-642, 1995; Cook, R. A.; Sergeyevsky, A. B.; Belbruno, E.; Sweetser, T. H.; Return to the Moon; The Lunar Observer Mission, Proceedings AIAA/AAS Astrodynamics Conf., Paper No. 90-288, August 1990; Sweetser, T., Estimate of the Global Minimum DV Needed for Earth-Moon Transfers, Proceedings AAS/AIAA Spaceflights Mechanics Meeting, Paper No. 91-101, February 1991; Humble, R. W., Blue Moon; A Small Satellite Mission to the Moon, Proceedings Int.Symp. on Small Satellite Systems and Services, Annecy, France, June 1996, all of which hereby incorporated by reference herein including all the references cited therein, and references previously incorporated herein.

The backwards method starts at the desired capture position y with respect to the WSB at the Moon where the osculating eccentricity $e_M<1$. Using this as the initial position, one integrates in backwards time. Because of the sensitivity of the region, a negligible increase in velocity at y will cause the S/C to escape the Moon in backwards time. It will have a periapsis at a point x with respect to the Earth where the integration is stopped. In general, this point will be different from the starting point $x_o$, for the S/C.

Figure 8:
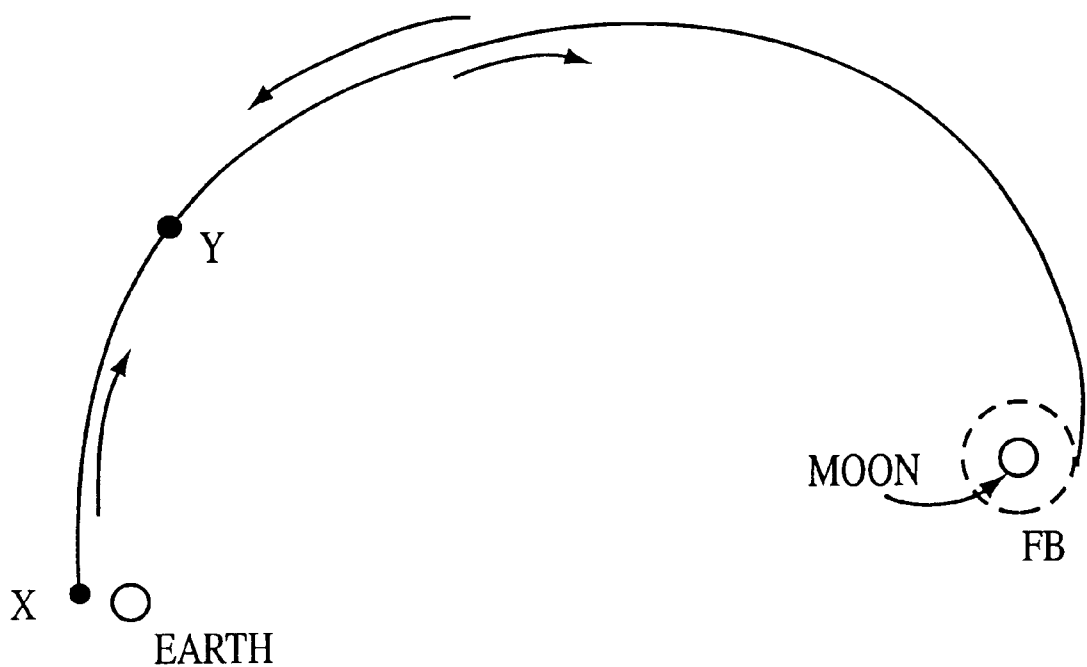
FIG. 8 is an illustration of a forward integration method so the end state of the forward integration matches the beginning state determined by the backwards integration.

The BCT is then found by performing a forward integration from $x_o$ to x. The path from x to the capture point y is already determined. The gain made in the $\Delta V$ savings due to ballistic capture is offset by the mismatch in velocity at x requiring a maneuver $\Delta V_M$. This is abstractly shown in FIG. 8. Variation of different parameters are used to try and reduce the $\Delta V_M$.

In the case of LGAS, $x_o$ is at 200 km altitude from the Earth, and x is at 100,000 km. The point y is 30,000 km over the north lunar pole. The S/C takes about one year to gradually spiral out to x using its low thrust ion engines, where $\Delta V_M$ is zero. The portion of the transfer from x to y in the WSB where $e_M=0$ takes 14 days.

The method was used again by Belbruno, assisted by J. Miller in 1990 for the Hiten mission of Japan. See previous references incorporated by reference herein. Hiten did not have sufficient propellant to be captured at the Moon by the Hohmann transfer, so the BCT was the only option. It was in elliptic Earth orbit where the periapsis radical distance was 8,900 km at $x_o$. The capture position y in the WSB was 100 km over the north lunar pole, where the osculating value of the eccentricity $e_M=0.94$.

Under the influence of solar perturbations, backwards integration from y pulled the S/C out to an Earth periapsis at x, 1.2 million km from the Earth. A tiny $\Delta V$ of 14 m/s at $x_o$ was sufficient to allow Hiten to move to x where $\Delta V_M=30$ m/s. The time of flight was 150 days. This BCT was used in 1991, and Hiten arrived at the Moon on October 2 of that year.

This type of BCT used by Hiten can be used for general lunar missions where injection conditions at the Earth and capture conditions at the Moon are arbitrary. To make it more applicable to general missions, the backwards approach would have to be generalized and made to be more flexible. Joint work form 1992-1993 discovered a way to adapt the backwards approach for general missions, including finding launch periods. Tandon, S., Lunar Orbit Transfers using Weak Stability Boundary Theory, McDonnell Douglas Internal Report (Huntington Beach), March 1993. However, this method is unwieldy and seemingly difficult to automate. This is because one has to generally satisfy six orbital elements at the Earth.

The joint work focused on BCT's with no maneuvers at x. By carefully adjusting the lunar capture WSB conditions at y, it is not difficult to adjust the backwards integration so that the trajectory comes back to the Earth at any desired altitude $r_E$, at $x_o$. In fact, variation of $e_M$ in the WSB in the third and higher decimal places is sufficient for this. The time of flight is only 80 days. However, when doing this, one has no control over the inclination, $i_E$. If one starts at $x_o$ and then tries to walk the inclination over to the desired value, it was seen immediately that it did not seem to be possible. Even a change in $i_E$ in the thousandths place causes the forward targeting algorithm to diverge when targeting back to the WSB conditions.

This can be solved by a more involved backwards integration where several lunar variables, $\Omega_M$ (ascending node), $\omega_M$ (argument of periapsis), $e_M$, have to be varied to achieve both the correct of $r_E$, $i_E$. However, the variables $\Omega_E$, $\omega_E$ remain to be satisfied. The procedure to do this is complicated and involves the comparison of many contour plots of the Earth elements, and backwards integrations. Eventually they can be satisfied. However, the approach is time intensive.

I have found, however, a set of variables with respect to the earth which give rise to a very flexible and well behaved forward targeting to ballistic capture lunar conditions using two variables at the Earth to vary, where the variables do not change in the process. These variables are 1. velocity magnitude,
2. flight path angle.

I have also discovered a way to efficiently find BCT's in a relatively simple forward targeting method from $x_o$ to y which is fairly robust. This forward method turns out to be 2×2. That is, two variables at the Earth are varied in a Newton's targeting algorithm to achieve WSB conditions at the Moon using two lunar elements. In carrying it out, most of the variables of interest at the Earth decouple in the process. This gives control on $r_E$, $i_E$, $\Omega_E$. Several examples are given below.

In order to have a robust search from the Earth at a given point $x_o$, to WSB conditions at the Moon at y, the algorithm should be able to converge down to a BCT with large initial errors in achieving the desired lunar conditions. The independent variables being varied at $x_o$ to achieve these lunar conditions should be decoupled from as many angular Earth elements as possible which include $i_E$, $\Omega_E$, $\omega_E$. It is assumed that search is done with a time from periapsis, $T_E$, approximately equal to zero. All three of these angular variables can be quite constrained depending on the launch vehicle. For example, for an Arianne IV, $i_E=7°$, $\Omega_E \approx 8°$ (West), $\omega_E=178°$.

The target variables at the Moon of main interest to satisfy are the radial distance, $r_M$, and the inclination, $i_M$. For the Blue Moon mission, assume $r_M$=2238 km, representing an altitude of 500 km, and $i_M$=90°. It turns out that if the S/C falls towards the Moon from approximately 1 to 1.5 million km form the Earth near an Earth apoapsis in approximately the ecliptic, then it falls into the lunar WSB provided the Earth-Moon-Sun geometry is correct.

The coordinate system at the Earth required for the targeting algorithm at $x_o$ is spherical coordinates. They are given by $r_E$, longitude, $\alpha_E$, latitude, $\delta_E$, velocity magnitude, $V_E$, flight path angle, $\gamma_E$, flight path azimuth, $\sigma_E$. The flight path azimuth is the angle from the positive z-axis of the local Cartesian coordinate system to the velocity vector $V_E$=(x,y,z). More exactly, $$\sigma_E = \cos^{-1}(z/V_E)$$

We fix $r_E$=6563.94 km corresponding to an altitude of 186 km for the Blue Moon. The targeting algorithm is given by varying $V_E$, $\gamma_E$ to try to achieve $r_M$, $i_M$. A standard second order Newton algorithm is used. Symbolically, $$V_E, \gamma_E \to r_M, i_M \quad (1)$$

It is checked that $i_E$, $\Omega_E$ are independent of $V_E$, $\gamma_E$, Thus, the 2×2 search defined by (1) does not alter $i_E$, $\Omega_E$. As a result, once (1) converges to a BCT, for a given $i_E$, $\Omega_E$ these can be changed and (1) can be rerun. This is done by taking the converged values of $V_E$, $\gamma_E$ together with the other four fixed spherical variables, and transforming them to classical elements. In the classical elements, $i_E$, $\Omega_E$ are changed as desired.

The classical state is then transformed back to spherical coordinates. The new spherical state will still have the same converged values of $V_E$, $\gamma_E$ (since $V_E$, $\gamma_E$ are independent of $i_E$, $\Omega_E$) however, $\alpha_E$, $\delta_E$, $\sigma_E$ will be changed. If this is not too much, the (1) should converge. In this way $i_E$, $\Omega_E$ can be systematically walked over to their desired values by rerunning (1) a finite number of times.

The remaining variable that there has been no control over is $\omega$. There are several approaches that could be used to adjust this variable. These range from variation of the Earth injection date (I/D), to the use of contours, or the inclusion of a maneuver. It is, in general, a good idea to construct contours of the time of flight ($T_f$), $i_E$, $\Omega_E$, $\omega_E$ by variation of $\Omega_M$, $\omega_M$. The data for these contours is generated by systematically varying $\Omega_M$, $\omega_M$ and for each different variation, adjusting $e_M$ so that the trajectory in backward time returns to Earth at the same radial distance. That is, by 1×1 Newton targeting $e_M \to r_E$.

For each value of ($\Omega_M$, $\omega_M$), the value of ($T_f$, $i_E$, $\Omega_E$, $\omega_E$) is recorded. These arrays can be used in any number of contour programs. The contours of these variables can be useful in determining regions of the parameter space, including I/D, where the desired values of $i_E$, $\Omega_E$, $\omega_E$ can be found.

It is noted that to start the procedure, a good guess for $V_E$, $\gamma_E$ and the other spherical variables needs to be found so (1) converges. There are many ways to do this. One thing to do is to go to classical elements, and choose $a_E$, $e_E$ so that the S/C is on an ellipse of an apoapsis between 1 and 1.5 million km, and that the periapsis distance is at the desired altitude. For example, realistic values are a=657,666 km, e=0.9900. The other variables can be manually tested to see if convergence of (1) results.

The robustness of (1) is illustrated in Table 1 which represents a change of $i_E$ by two degrees from a previously converged case with $i_E$=21.56° (EME of Date) to 19.56°.

Throughout the search, $\Omega_E$=36.51°. Although there is a huge miss distance of 252,243 km on the first iteration, convergence still results. The resulting time of flight on the converged iteration was 93 days, 5 hours, 13 minutes.

TABLE 1

Targeting Iterations

| Iteration | $V_E$ | $Y_E$ | $r_M$ | $i_M$ | $e_M$ |
|---|---|---|---|---|---|
| 1 | 10.992708088 | 1.310755264 | 252243.45 | 157.23 | 1.79 |
| 2 | 10.992996382 | 1.310755164 | 59489.90 | 54.70 | .21 |
| 3 | 10.992972418 | 1.310755175 | 36675.56 | 56.85 | .32 |
| 4 | 10.992950388 | 1.310755214 | 11753.77 | 54.34 | .62 |
| 5 | 10.992928540 | 1.310604119 | 6286.67 | 67.74 | .80 |
| 10 | 10.992752082 | 0.906403936 | 2237.74 | 89.93 | .93 |
| 11 | 10.992751828 | 0.905723383 | 2241.06 | 90.03 | .93 |
| 12 | 10.992751819 | 0.905724637 | 2238.00 | 90.00 | .93 |

This discussion is concluded with the documentation of a BCT for Blue Moon which is designed for an Arianne IV launch vehicle:

1. Earth Injection
T: Jul 16, 1997 06:16:55 (ET)
$r_E$=6563.94 km
$V_E$=10.99 km/s
$i_E$=7°
2. Apoapsis
T: Aug. 22, 1997 11:48:08
$r_E$=1,370,923 km
$V_E$=0.215 km/s
3. Lunar Capture
T: Oct. 19, 1997 06:52:47
$r_M$=2238.00 km
V(Moon)=2.08 km/s
$a_M$=84,217.12 km
$e_M$=0.97
$i_M$=90°

Figure 9:
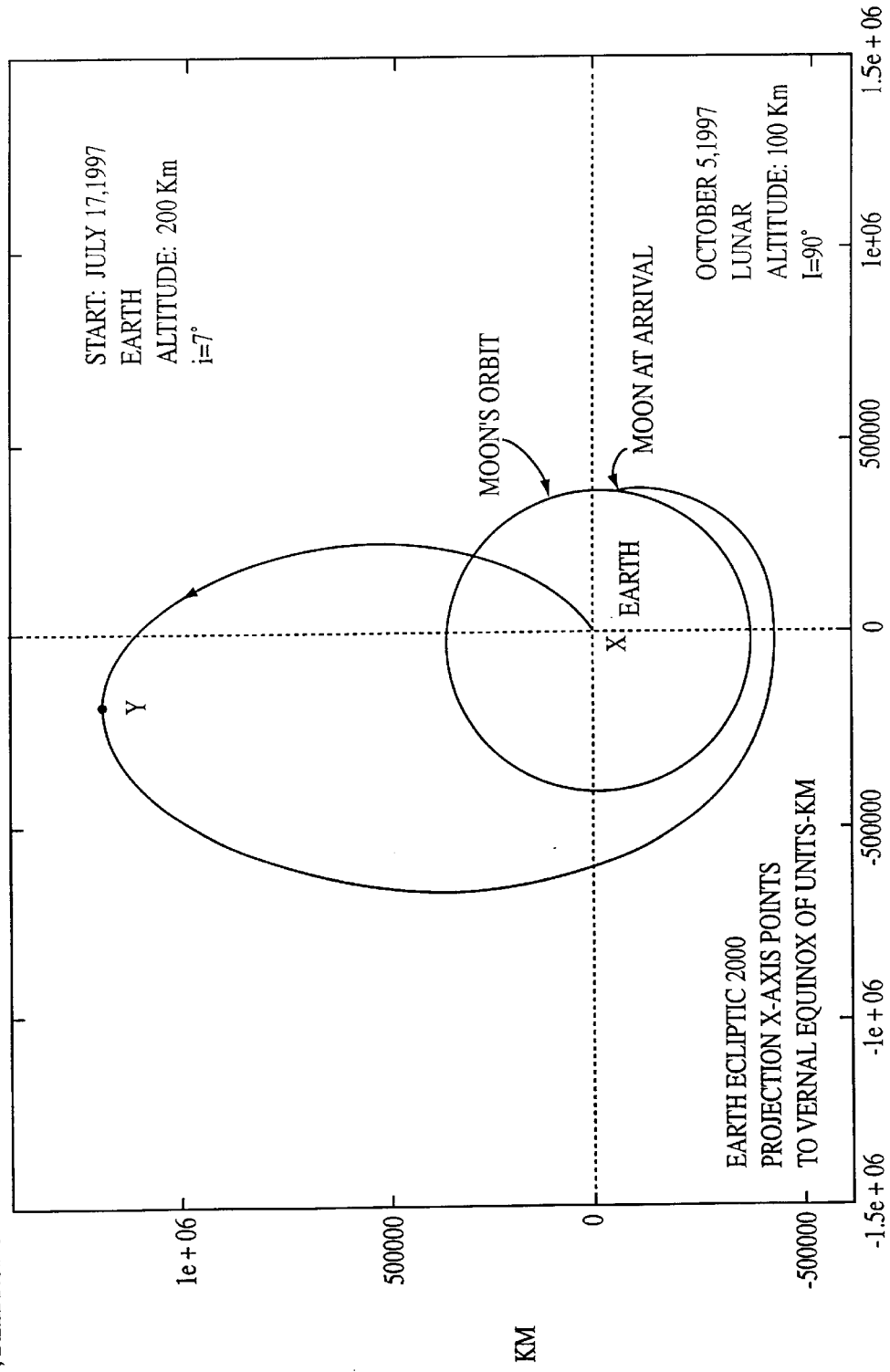
FIG. 9 is an illustration of an operational BCT determined by the forwards integration in accordance with the present invention.

This BCT is plotted in FIG. 9.

Figure 10:
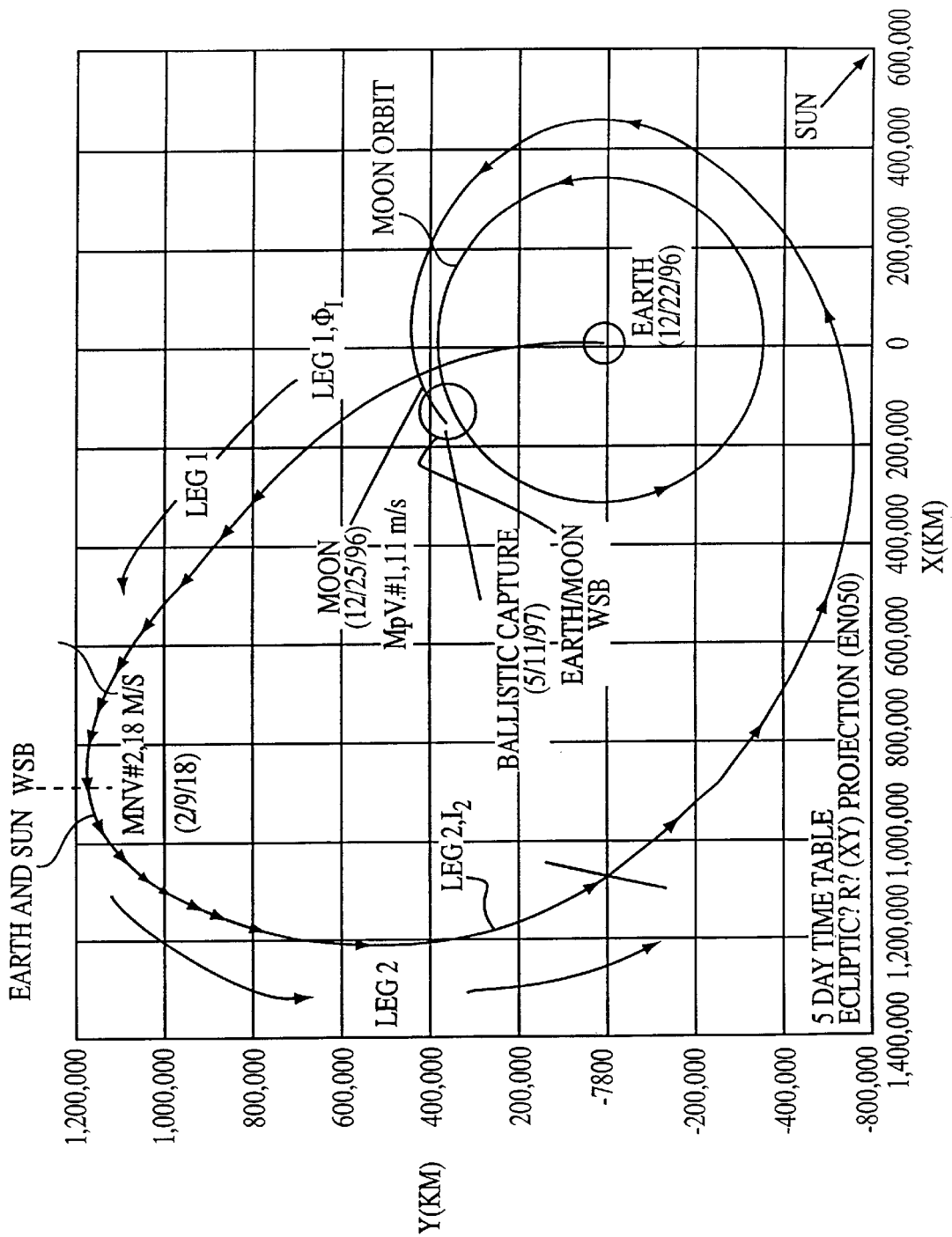
FIG. 10 is another illustration of an operational BCT determined by the forwards integration in accordance with the present invention.

FIG. 10 is another illustration of an operational BCT determined by the forwards integration in accordance with the present invention. In FIG. 10, the ballistic lunar capture trajectory is illustrated. Leg 1 of the trajectory begins at the earth, substantially near the earth or at an orbit around the earth and extends until the earth-sun weak stability boundary. Maneuver 1 is associated with leg 1, and may be, for example, 11 meters per second (m/s) at the earth-sun WSB. Alternatively, the thrust may be designed such that at the earth-sun WSB, the object in the trajectory is going faster than 11 m/s or even arrives at the earth-sun WSB at zero m/s.

The object passes the moon area approximately three day later along leg 1. In addition, the object arrives at the end of leg 1 approximately one and a half months later. At the earth-sun WSB, a second maneuver is performed for leg 2 of the journey which takes the object from the earth-sun WSB to lunar capture around the moon. This time period takes approximately another three months for leg 2.

Whereas the backwards integration approach took one month of daily full time work to find an operational BCT, this new procedure with forward targeting, takes a few minutes on a computer. It can easily be automated to walk i, $\Omega$, $\omega$ over to their desired values. However, this is easily done manually. It is noted that the targeting procedure is only a 2×2. That is, two control variables and two target variables. Given the nature of the BCT, this is an elegant procedure.

Figure 11:
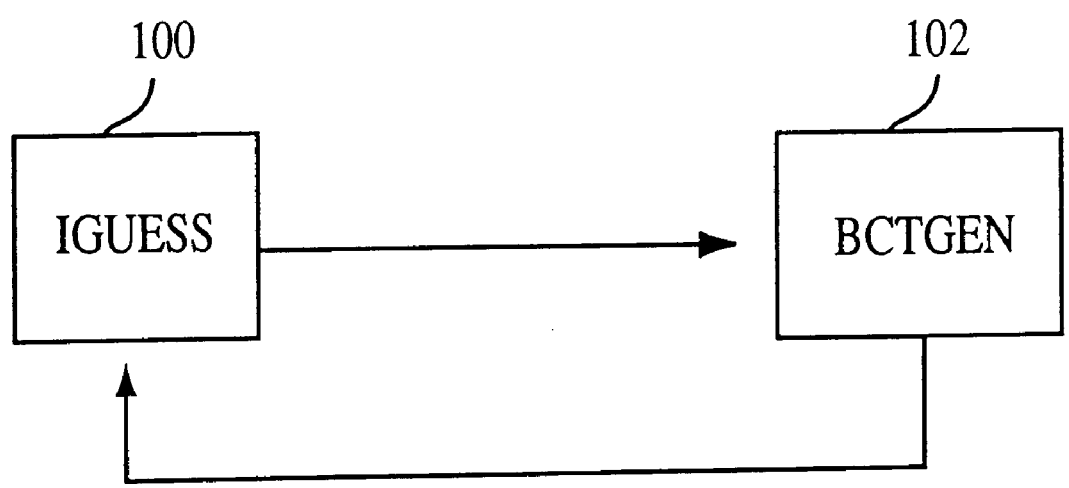
FIG. 11 is a conceptual illustration of a flowchart of the interaction between the Numerical Integrator and the Initial Condition Generator.

The software required to do this is
1. Numerical integrator with targeting capability,
2. Initial condition generator. See FIG. 11 for a flowchart of the interaction between the Numerical Integrator 102 and the Initial Condition Generator IGUESS 100 in accordance with the present invention.

The integrator is extremely accurate and is a standard 10th order, or other standard integrator. The targeter is a standard second order Newton's method. This integrator models the solar system as accurately as is scientifically available, and uses a planetary ephemeris. This accuracy is necessary since this procedure produces operational transfers that are suitable for real missions and flight.

The trajectories generated by the integrator are found to be in negligible error with the actual paths of the spacecraft. The integrator-targeter is in stand-alone source code and is written in FORTRAN. This integrator-targeter software is included in U.S. provisional application serial No. 60/036, 864, incorporated herein by reference. The initial condition generator produces a good initial guess in the desired targeting variables in spherical coordinates, and allows incremental change in i, $\Omega$, $\omega$. This is needed so that the targeter can converge.

The integrator-targeter requires a precise planetary ephemeris of the motions of the planets. It is the standard data file for the planets produced at JPL and is called DE403, incorporated herein by reference. It is used throughout the world for astronomers and in aerospace.

While the above description or process has focused on lunar capture from an object emanating from the earth or earth orbit, the above process is applicable for traveling between any two planets, and optionally or preferably where the sun's gravitational effect is assumed to be present. For example, instead of transferring from the earth to the moon as previously described, one can choose a different pair of objects, such as leaving from an orbit about Jupiter and transferring to the weak stability boundary of the satellite Europa. In this way, one also achieves ballistic capture at Europa.

Note that the physical appearance of the transfer from Jupiter to Europa is substantially similar to the earth-moon transfer. To apply the above process for this example, merely replace the word "earth" with Jupiter, and the word "moon" with Europa. See, for example, AAS 97–174, "Trajectory Design for a Europa Orbital Mission," Sweetser et al., (Feb. 10–12, 1997), incorporated herein by reference.

Figure 11A:
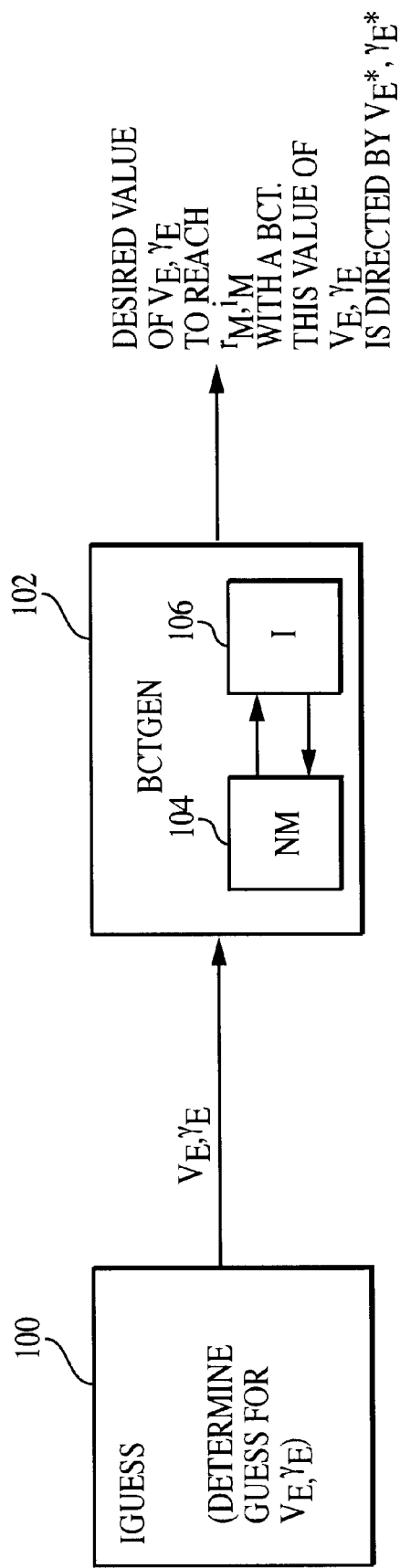
FIG. 11A is a detailed illustration of a flowchart of the interaction between the Numerical Integrator and the Initial Condition Generator.

FIG. 11A is a detailed illustration of a flowchart of the interaction between the Numerical Integrator and the Initial Condition Generator. As illustrated in FIG. 11A, the procedure of the present invention uses two different types of variables in the targeted search, using a second order Newton's method (NM) 104 for the targeter, and a 10th order integrator (I) 106 to numerically propagate an orbit (or trajectory) from the earth to the moon. A 2×2 search is used for the targeter (although other dimensional searches may also be used), i.e., two variables (out of 6) are varied at the earth, and target to two at the moon (out of six).

At the moon, two parameters are enough. They are $i_M, r_M$. For the targeter, a special set of 6 variables are preferably used, called spherical coordinates, and two of these are selected to vary to reach $i_M$, $r_M$ (of course, the present invention also includes the use of different variables that are derivable from the present invention). The six variables are $r_E, \alpha_E, e_E, V_E, \gamma_E, \sigma_E$. The two that are actually varied are $V_E, \gamma_E$. With a good guess for $V_E, \gamma_E$ the targeter converges. IGESS 100 determines a good initial guess for $V_E, \gamma_E$.

The targeter incorporates the integrator as it operates. It needs to use integrator I multiple times as it operates. Its goal is to iteratively determine the accurate value of $V_E, \gamma_E = V_E^*$, $\gamma_E^*$ so that a BCT reaches the moon to the desired values of $r_M, i_M$. Only one guess from IGESS is required at the very start of the targeting process.

Figure 11B:
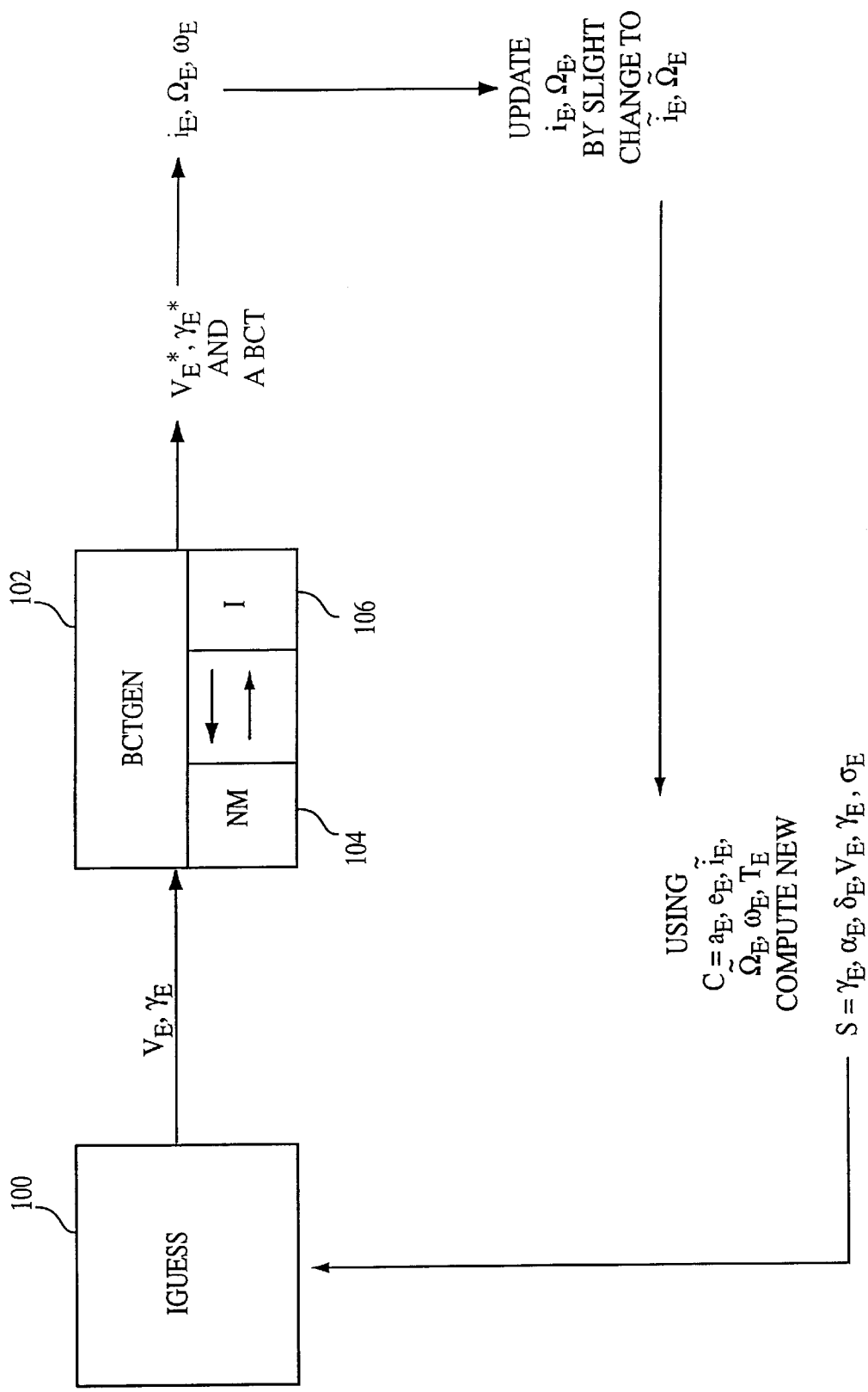
FIG. 11B is another detailed illustration of a flowchart of the interaction between the Numerical Integrator and the Initial Condition Generator.

FIG. 11B is another detailed illustration of a flowchart of the interaction between the Numerical Integrator and the Initial Condition Generator. The BCT just produced goes from the Earth at a given orbital state to the moon where $r_M$, $i_M$ are achieved to their desired values. In the process described in FIG. 11B, only $V_E, \gamma_E$ are varied, and the other four variables $r_E, \alpha_E, S_E, \sigma_E$ are fixed. Our six variables determined are therefore $r_E, \alpha_E, S_E, V_E^*, \gamma_E^*, \sigma_E$.

To make an operational BCT, 6 orbital parameters making what's called an orbital state, are required at the earth. They are given ahead of time by a mission, and must all be satisfied. The variables usually need to satisfy another set of variables, related to the above ones, but different. They are called classical elements, and are $\alpha_E, e_E, i_E, \Omega_E, \omega_E, T_E$. The above converged state, $S = r_E, \alpha_E, S_E, V_E^*, \gamma_E^*, \sigma_E$ will yield a specific set of classical variables $C = \alpha_E, e_E, i_E, \Omega_E, W_E, T_E$.

In general, the values of the classical variables will not be what the mission may require. A mission will want a specific $i_E = i_E^*, \Omega_E, W_E^*$. These are usually trick to nail down. The others, $\alpha_E, e_E, T_E$, are easy to determine, and not really an issue. If, as $V_E, \gamma_E$ varied in NM, $i_E, \Omega_E$ varied, that would be a complication. However, $i_E, \Omega_E$ are independent of $V_E$, $\gamma_E$, so they remain fixed as NM converges. Thus, after NM converges, $i_E, \Omega_E$ can be updated to a slightly different value, and NM should converge again. By iteratively doing this, $i_E, \Omega_E$ can be gradually walked over to their desired values, after applying FIG. 11A many times. The best way to vary $i_E, \Omega_E$ can be guided by knowing the contour space of C, which can be determined by standard contour programs (e.g., CONT commercial program). The final variable left is $W_E$ which does vary as NM operates. However, it varies little and can also be walked over to its desired value.

In summary, the process described in FIG. 11B is reiterated or reapplied until $i_E, \Omega_E$ are walked over to desired values. A standard contour program is used to assist in this. Finally, walk over $W_E$ to its desired value by reapplying the process described in FIG. 11B a sufficient number of times.

According to another embodiment of the invention, orbital systems are provided for useful earth-to-moon, earth-to-earth orbit, moon-to-earth/earth orbit, and/or interplanetary travel, which utilize weak stability boundaries for orbit entry and/or inclination changes. I have determined that the starting position from the earth for a BCT computed with this procedure can be at any altitude, suitable for any launch vehicle, including the international space station Alpha, under development, the revolutionary single stage to orbit vehicle called Venture Star using a new type of rocket engine under development by Lockheed, and the like.

I have also determined that the BCT has a key feature that enables it to offer substantial Delta-V savings in changing the inclinations for earth orbiting satellites, as described in detail below.

Figure 13:
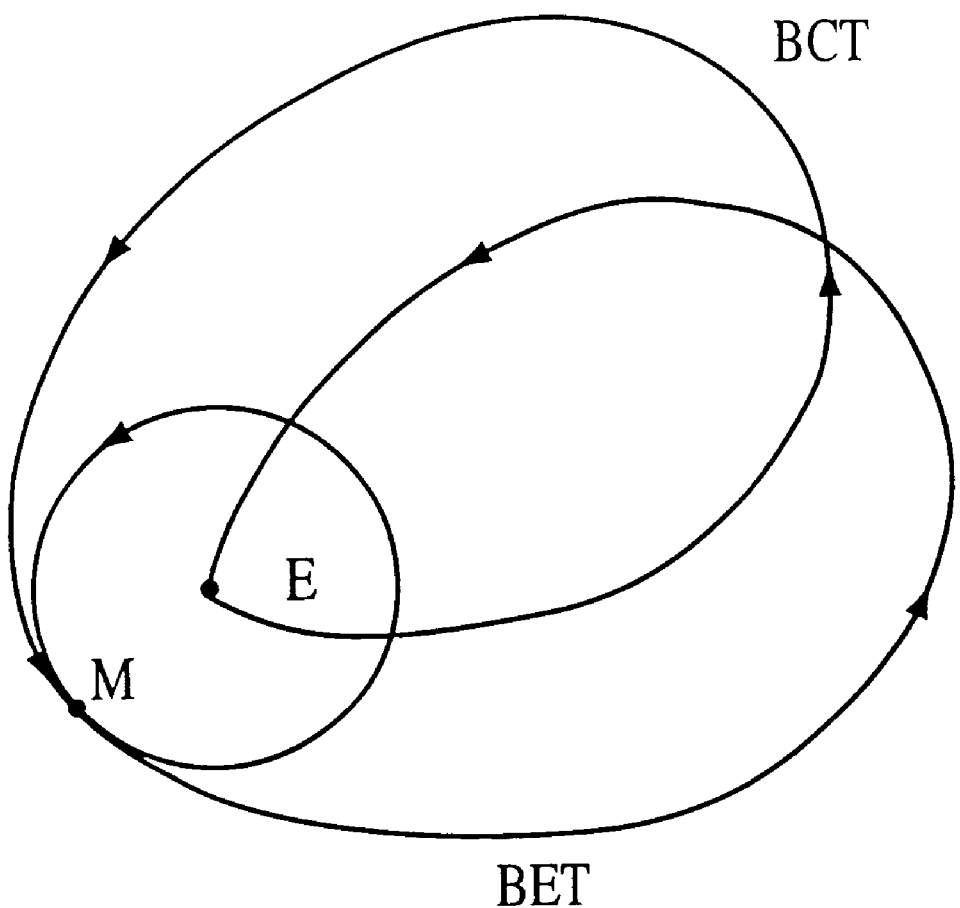
FIG. 13 is an illustration of BET (Ballistic Ejection Transfer) which goes back to the earth from a WSB (Weak Stability Boundary) to any desired altitude and inclination.

When the satellite arrives at the moon at the point y in ballistic capture, a negligible Delta-V can cause it to leave the moon on a reverse BCT, a so called BET (Ballistic Ejection Transfer) which goes back to the earth from the WSB to any desired altitude and inclination (See FIG. 13).

This property follows from the numerical fact that a negligible change of the eccentricity e with respect to the moon for a spacecraft in weak capture at the WSB causes ejection from the moon where it escapes the moon. I have determined that it can be viewed as symmetric to the BCT. In the same way a BCT is captured at the moon for zero Delta-V, a BET escapes the moon for zero Delta-V. This can be facilitated by a negligible increase in the eccentricity of the orbit while in the WSB to cause ejection onto a BET with desired properties when it reaches the earth at the periapsis of $E_2$.

More precisely, to be in the WSB means that e<1 at a time $t=t_o$. Ejection from the moon at a later time $t=t_1>t_o$ means that $e(t_1)>1$. A negligible change in e at $t_o$ means that e is changed to a new eccentricity $e(t_o) \rightarrow e(t_0)+\delta$, where $\delta$ is negligible. (In the case of the example listed above in FIG. 9, ballistic capture at the WSB at the lunar altitude of 100 km over the north lunar pole implies that e=0.94. An increase in e in the fourth decimal place causes ejection from the moon at a later time $t=t_1$ which is only a few hours from $t_o$. A change in e in the fourth decimal place is equivalent a negligible Delta-V to cause the ejection. In this case, $\delta$=0.000a, where a >0 is an integer 1,2, . . . ,9).

To have a BET which goes to desired values of $h_E$ (altitude), $i_E$, the satellite must be ejected from the WSB in the correct direction and time. I have discovered that symmetries in the three-body problem prove the existence of BET's, back to the Earth, approximately symmetric with BCT's in position and velocity space. The model we are using is close to the idealized restricted three-body problem between the earth, sun, satellite where such a symmetry must exist. Once the satellite is beyond the WSB after ejection, or before capture, the gravitational effect of the moon is negligible. In a sun-fixed coordinate system centered at the earth, where the x-axis is the earth-sun line, a BET can be approximately obtained from a BCT by reflection across this axis. The Forward Method precisely finds them. This property and its implications are discussed further in the next section.

The above property has important implications. It solves the problem of reducing as far as possible the amount of Delta-V required to change the inclination of earth orbiting satellites.

This fact is now explained. Begin with a satellite in an arbitrary elliptic orbit, $E_1$, about the earth with an inclination $i_{E,1}$. If it is desired to change the inclination to another value, $i_{E,2}$, then a standard maneuver is performed to do this requiring a Delta-V. This maneuver is done at periapsis. The bigger the inclination change, that is $\Delta i_E = |i_{E,2} - i_{E,1}|$, the larger the Delta-V, labeled, $\Delta V_I$. For example, if the elliptic earth orbit happens to be circular at an altitude $h_E$, with corresponding circular velocity $V_c$, then the formula results, $$\Delta V_I = 2V_c \sin(\Delta i_E/2)$$

Figure 14:
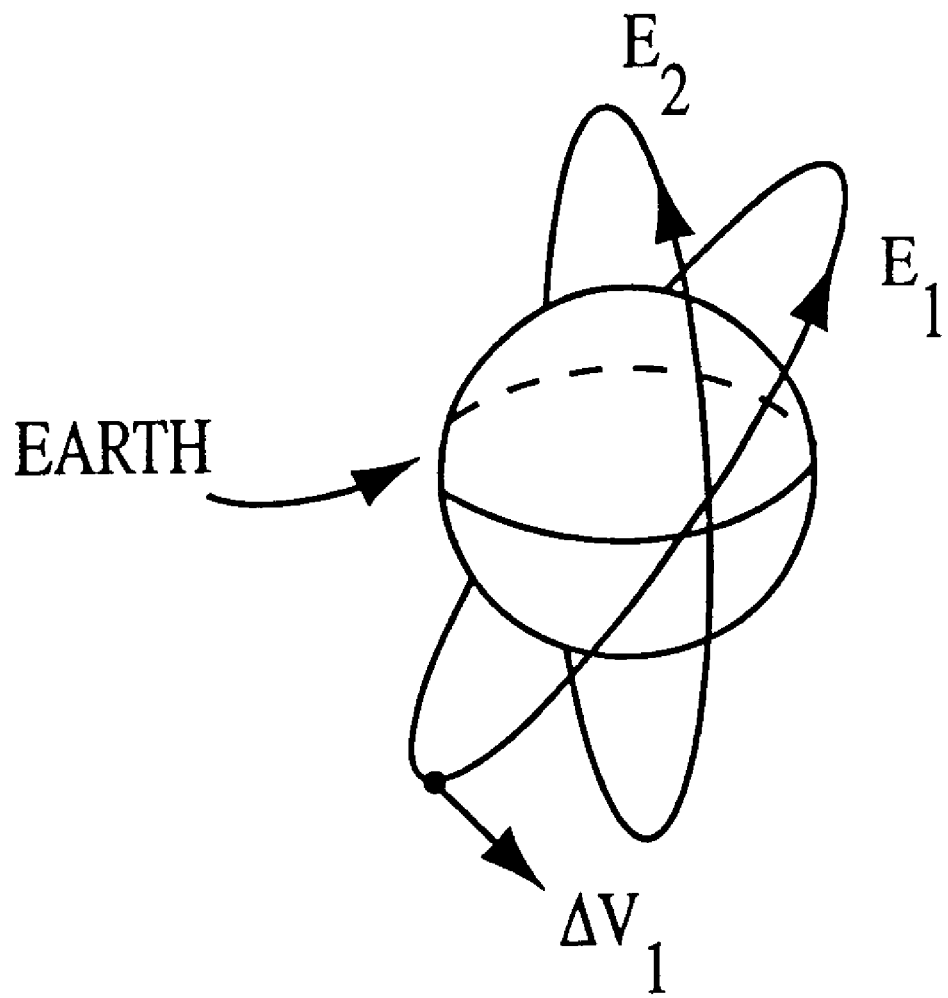
FIG. 14 is an illustration of a standard inclination change maneuver.

This maneuver is done normal to the orbital plane (See FIG. 14).

To reduce the size of $\Delta V_I$ is the goal.

Figure 15:
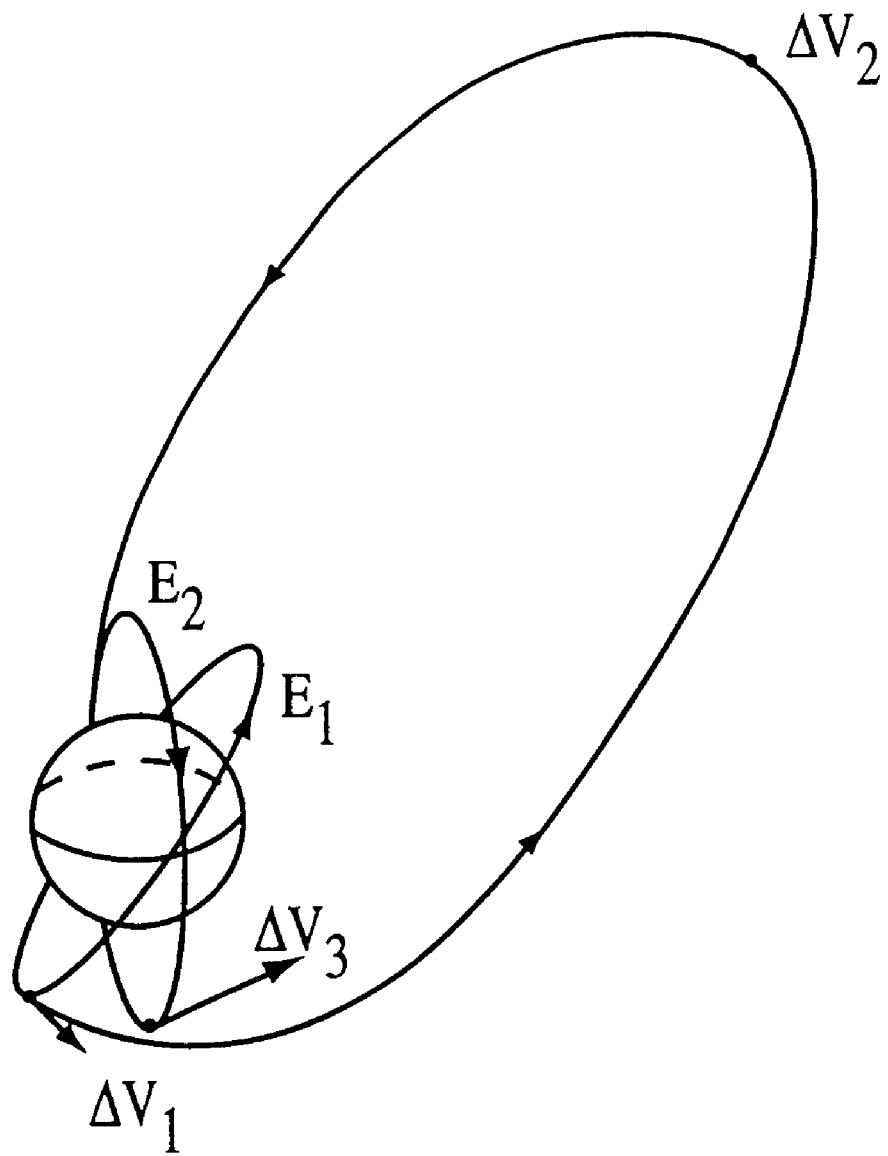
FIG. 15 is an illustration of an inclination change maneuver by removing the spacecraft from Earth orbit and performing the inclination change away from Earth.

A way to do this is to take the satellite out of its original elliptic orbit $E_1$ of inclination $i_{E,1}$, by doing a maneuver $\Delta V_1$ at the periapsis of the ellipse. The satellite will then be moving away from the earth. At some later time when the satellite is sufficiently far from the earth in a suitable location, a maneuver $\Delta V_2$ is done to bring the satellite back to the earth to the periapsis of an ellipse $E_2$ which is the same as $E_1$, except the inclination has changed to $i_{E,2}$. A final maneuver $\Delta V_3$ is applied at the periapsis so the satellite will go into the final orbit $E_2$ (FIG. 15).

$\Delta V_I$ is compared to $\Sigma = \Delta V_1 + \Delta V_2 + \Delta V_3$. It is desired to have $\Sigma < \Delta V_I$.

This can happen when $\Delta i_E$ is sufficiently large, and $\Delta V_2$ is sufficiently small. The Delta-V saved is $\Delta V_I - \Sigma$.

A way to minimize $\Delta V_2$ is to use the moon. An attempt to do this, as described above in detail, is in U.S. Pat. No. 5,507,454 by J. Dulck, incorporated herein by reference, where the standard technique of lunar gravity assist is used. The satellite is first brought to a neighborhood of the moon by a Hohmann transfer. It then flies by the moon in just the right directions and velocities, where $\Delta V_2$ may be broken up into two or more maneuvers. It then is brought back to the earth on a return Hohmann transfer where the inclination has been changed to $i_{E,2}$ from the original value $i_{E,1}$.

This method works, but $\Delta V_2$ is approximately 600 m/s. The size of this maneuver restricts the applications of their method to ellipses whose eccentricities are sufficiently large. This is because to have a savings with this large maneuver, $\Delta V_1$, $\Delta V_3$ the final maneuver, needs to be sufficiently small. A way to make this happen is to have the eccentricities of the $E_1$, $E_2$ be as large as possible. That is, as close to 1 as possible. The size of these maneuvers will be maximized when these eccentricities are 0 for circular earth orbits. This is because a higher eccentricity means that the periapsis velocity of the ellipse is higher.

A smaller value of the velocity, therefore, is needed in order to have the satellite leave the ellipse and go to the moon on a Hohmann transfer, or be captured back at the earth from another return Hohmann transfer. The method in Dulck is applied to, or limited by, geotransfer type orbits which have large eccentricities. The method in Dulck gains relatively little or provides little benefits/savings for low circular orbits.

I have determined that a new method which yields a substantially better savings in $\Delta V_I$ can be obtained by using ballistic lunar capture at the WSB. This is the case because I have determined that the property discussed above implies that $$\Delta V_2 = 0$$

in this case. Ballistic lunar capture is completely different from standard gravity assist. In gravity assist, the gravitational interactions of the satellite with the moon is modeled in a simple two-body way which does not include the earth. Ballistic capture at the moon is impossible in the two-body formulation. In the two-body formulation between, for example, the satellite, spacecraft or other object and the moon, the WSB does not exist. Ballistic capture exists in the three-body modeling between the satellite or spacecraft, moon and earth. The WSB exists in this formulation. The BCT itself exists in the more complicated four-body formulation between the satellite, moon, earth, sun. It does not exist if the sun is not modeled.

The implications of having $\Delta V_2 = 0$ are considerable, and using the BCT and BET, a substantially better savings can be made over the previous method. Also, this new method is also significant for low circular earth orbits which have substantial applications to the telecommunications industry. This is not the case with the other methods currently being used, as described above.

More precisely, this new method is to first apply a maneuver $\Delta V_1$ to put the satellite onto a BCT to the moon from $E_1$ at, for example, the periapsis. The exact algorithm and method for doing this is described in U.S. Provisional Patent Application No. 60/036,864, filed on Feb. 4, 1997, incorporated herein by reference, and is briefly stated below, although other similar algorithms that provide similar results may be used. It turns out that $\Delta V_1$ is approximately the same as the value that would be needed for a Hohmann transfer, so there is no significant loss in this case by going to a BCT.

The BCT brings the satellite to weak lunar capture in the WSB at the desired altitude $h_L$ after about 80–100 days. This determines the eccentricity, $e_L$, and semi-major axis, $a_L$. The inclination, $i_L$, and other lunar elements; argument of periapsis, $\omega_L$, node, $\Omega_L$ are chosen so that the satellite can be retargeted back to the earth to the desired earth inclination, $i_{E,2}$, and periapsis altitude, $h_E$, required for $E_2$. It comes back to the earth on a BET by altering the lunar elements in a negligible way. The exact algorithm is described below, although other similar algorithms that provide similar results may be used.

The satellite arrives at earth periapsis 80–100 days after leaving the WSB. The satellite should be in the WSB as short a time as possible because it is a chaotic region. However, a tiny stabilizing maneuver of negligible magnitude can be applied directly after ballistic capture so it can orbit the moon for a month or more if timing is an issue. Then when the timing is correct, a tiny, negligible maneuver puts it on a BET to the earth. This implies that $\Delta V_2 \approx 0$. When the satellite arrives back to the earth at periapsis, $\Delta V_3$ is applied to put the satellite into the desired ellipse $E_2$.

This maneuver is approximately the same as is required for a returning Hohmann transfer, so there is no significant loss from arriving on a BET at the earth at the periapsis of $E_2$. Symbolically, we have $$E_1 \rightarrow \Delta V_1 \rightarrow BCT \rightarrow \text{lunarcapture} \rightarrow \Delta V_2 \approx 0 \rightarrow BET \rightarrow \Delta V_2 \rightarrow E_2$$

Figure 16A:
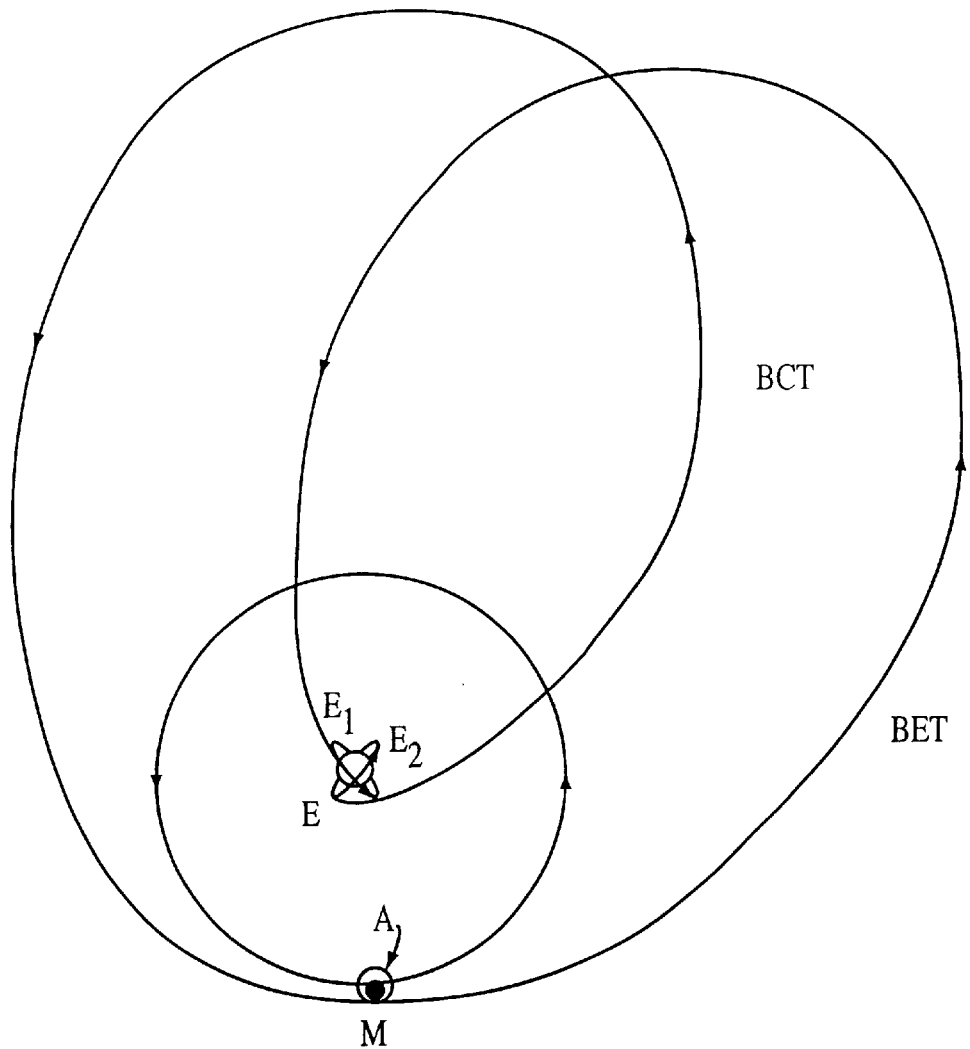
FIGS. 16A–16B are illustrations of an inclination change maneuver by bringing the spacecraft/satellite to ballistic capture at the moon on a Ballistic Capture Transfer (BCT), maneuvering around the moon in a WSB in an intermediate orbit, and then returning to Earth on a BET.
Figure 16B:
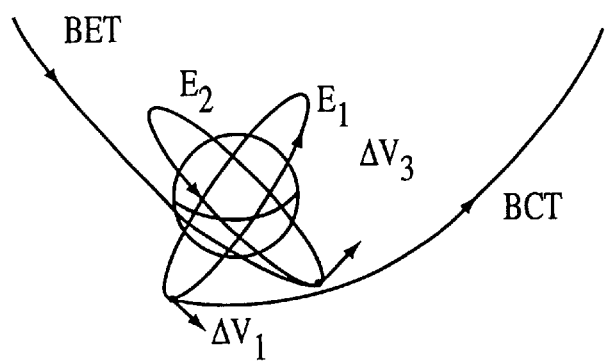

(See FIGS. 16A–16B).

There are two remarks to all of this. The first is that the time of flight may be 160–200 days. This is a consideration for trade off studies for total Delta-V saved. Another relates to the generality of the method. We have assumed throughout that the shape and size of $E_1$ has remained the same. That is, $e_E$, $a_E$, $h_E$ have not changed. This need not be the case. In the course of changing $i_{E,1}$, these latter three elements could be allowed to change also. Advantageously, we are assuming in the most general way, that $E_2$ may have different values of $h_E$, $e_E$, $a_E$ that $E_1$ had. $h_E$ is the altitude at the earth of either the original ellipse $E_1$ or the final ellipse $E_2$, and this variable $h_E$ can be adjusted to any desired value. Therefore, in addition to this procedure giving an arbitrary inclination change, it also provides an arbitrary altitude change.

The main computer process or algorithm is the Forward Method described in detail in U.S. Provisional application, filed Feb. 4, 1997, Serial. No. 60/036,864, incorporated herein by reference, although, as also described above other functionally equivalent algorithms may also be used. It is briefly summarized. At $h_E$, at the periapsis of $E_1$, $V_E$, $\gamma_E$ are varied to target to the lunar WSB at the desired values of $i_L$, $h_L$. This is a quadratic Newton's targeting method, together with a precision numerical integrator using the standard planetary ephemeris DE403. A sufficiently good guess in $V_E$, $\gamma_E$, are generally required so the targeter can converge. This is described in U.S. Provisional application, filed Feb. 4, 1997, Serial. No. 60/036,864. Symbolically, $$V_E, \gamma_E \rightarrow i_L, h_L. \tag{2}$$

This algorithm has the property that $\Omega_E$, $i_E$ remain fixed, so that they can be systematically walked over to their desired values for $E_1$ by repeated reapplication of the targeting algorithm. The variable $\omega_E$ can be nailed down by using contour plots of the earth parameters, described in U.S. Provisional application, filed Feb. 4, 1997, Serial. No. 60/036,864, together by walking it over as well, by reapplication of the targeting algorithm. Also, in this algorithm, the lunar arrival time at ballistic capture is a free parameter. This parameter is labeled A/D for arrival date. The moment the BCT leaves the periapsis of $E_1$, is called the injection date, labeled I/D.

In this way, a precise BCT can be generated on the computer which satisfies all of the required orbital elements for $E_1$ on a desired I/D. This was carried out for the BCT listed in FIG. 9. The converged value of $V_E$ yields $\Delta V_1$ by subtracting the value of the velocity of $E_1$ at periapsis, $$\Delta V_1 = V_E - \sqrt{Gm_E(1+e_{E1})/r_E}, \tag{3}$$

where $e_E = e_{E1}$ is the eccentricity of $E_1$, $m_E$ is the mass of the Earth, and G is the gravitational constant. $\Delta V_1$ increases the velocity of $E_1$ at periapsis so that the satellite can move onto a BCT.

When the satellite arrives at the moon on A/D at lunar periapsis in ballistic capture at the WSB, the elements $i_L$, $h_L$, $e_L$ are determined and the capture Delta-V is therefore 0. The remaining elements are $\omega_L$, $\Omega_L$, $\phi_L$, where $\phi_L$ is the eccentric anomaly. Since the present invention, for example, targets to osculating lunar periapsis, then $\phi_L = 0$, and is therefore determined as well. Thus, $\omega_L$, $\Omega_L$ are free. It is assumed that these elements are in the correct location of their parameter space to allow the next targeting to the earth using a BET.

If this is not the case, then a negligible stabilization maneuver of approximately 10 m/s, I have determined, will insure the satellite will not escape the moon from the WSB for approximately one month (See, for example, Yamakawa, H.; Kawaguchi, J.; Ishii, N.; Matsuo, H., On Earth-Moon Transfer Trajectory with Gravitational Capture, Proceedings AAS/AAIA Astrodynamics Sp. Conf., Paper No. AAS 93–633, August 1993, incorporated by reference in U.S. Provisional application, filed Feb. 4, 1997, Serial. No. 60/036,864, which hereby, and by definition, incorporates by reference all references cited therein). Then, this gives ample time to move it to suitable region of the parameter space for these elements. I have determined that the satellite can be moved about the moon in the WSB with negligible Delta-V since its motion is dynamically balanced, and therefore, sensitive enough so that negligible maneuvers suffice to move it around. These maneuvers should total approximately, for example, 1 m/s. This method can also be used for storage of equipment in the WSB of the moon for any predetermined period of time.

The targeting from the moon to earth periapsis to the required values of $h_E$, $i_{E,2}$ for $E_2$ again uses, for example, the Forward Method, starting at the moon instead of the earth. Variation of $V_L$, $\gamma_L$ is used at $h_L$ to target to $h_E$, $i_{E,2}$, where $V_L$ is the magnitude of the velocity with respect to the moon. Symbolically, $$V_L, \gamma_L \rightarrow h_E, i_{E,2}. \tag{4}$$

Convergence of this algorithm yields a BET. The identical targeting algorithm and software may therefore be used for the BET that was used for the BCT. The software also generates the actual trajectory. Its time of flight will be 80–100 days. Its A/D at earth periapsis for $E_2$ is determined after the targeting algorithm converges since the A/D is a free parameter in the targeted search.

The injection date I/D of the BET from the moon, together with $i_L$, $\Omega_L$, which are fixed under the Forward Method algorithm, can be manually varied to achieve the required values of $\Omega_E$, $\omega_E$ for $E_2$ at earth periapsis. The Delta-V required by the targeting algorithm is, for example, approximately less than 1 m/s. Thus, the total amount used from once the satellite became captured at the moon is, for example, approximately 11 m/s. Thus, adding this onto $\Delta V_2$ yields, $$\Delta V_2 \approx 0.$$

At earth periapsis, I have determined that the maneuver $\Delta V_3$ reduces the velocity $V_E$ of the BET to that of $E_2$ by the formula, $$\Delta V_3 = V_E - \sqrt{Gm_E(1+e_{E2})/r_E}, \quad (5)$$

where $e_E = e_{E2}$ is the eccentricity of $E_2$. Advantageously, we are assuming in the most general way, that $E_2$ may have different values of $h_E$, $e_E$, $a_E$ that $E_1$ had. $h_E$ is the altitude at the earth of either the original ellipse $E_1$ or the final ellipse $E_2$, and this variable $h_E$ can be adjusted to any desired value. Therefore, in addition to this procedure giving an arbitrary inclination change, it also provides an arbitrary altitude change.

Summary of Procedure

I. BCT From E1 to Ballistic Lunar Capture

On I/D=I/D at E1 periapsis, at $h_E$, $i_{E,1}$, apply Forward Method given by Equations (2) to determine BCT. Walk over $\Omega_E$, $\omega_E$, to their desired values using reapplication of Equations (2). The converged value of $V_E$ yields $\Delta V_1$ using Equation (3). A/D$_1$ at moon determined by Forward Method as a free variable.

II. Arrival at the Moon, and BET Determination

On A/D$_1$, BCT arrives at lunar periapsis at $h_L$, $i_L$ satisfied by Step I, where $\Delta V_2 = 0$. Stabilize by adding, for example, approximately 10 m/s. With, for example, approximately 1 m/s, move satellite to suitable values of $\Omega_L$, $\omega_L$ so a BET can be successfully targeted to the earth. After a time T from A/D$_1$, apply Forward Method given by Equation (4). Manually adjust $\Omega_L$, $\omega_L$ and reapply (4) in order to satisfy the values of $\Omega_E$, $\omega_E$ necessary for $E_2$. BET finally determined with I/D$_2$=A/D$_1$+T. BET arrives at earth periapsis on A/D$_2$.

III. BET From The Moon to E2

BET arrives at periapsis of E2 at $h_E$, $i_{E,2}$ on A/D$_2$ as determined from Step II. The elements $i_{E,2}$, $\Omega_E$, $\omega_E$, are satisfied for E2. The remaining elements for E2, $a_E$, $e_E$ are satisfied after application of $\Delta V_2$ as determined from Equation (5).

While Steps I–III detail the specific computational procedure, other computations may also be used (if in existence) that are functionally equivalent to perform the main functions of:

I. BCT from E1 to Ballistic Lunar Capture;
II. Arrival at the Moon, and BET Determination; and
III. BET from the Moon to E2.

Further, the above method may be utilized in connection with any region of space that exhibits the properties of WSB to some form of ballistic capture. In addition, the recursive nature of both BCT and BET facilitate computational efficiency as well as feasibility.

Comparisons With Delta-V Savings

The total Delta-V savings of the method presented here, we refer to as the WSB Inclination Change Method, or simply, WSB-ICM for short, is briefly compared to the standard way of just doing a single inclination change maneuver at the periapsis of E1, which we refer to as the Classical Method, or simply CM. The WSB-ICM is also compared to the method described in Cook, R. A.; Sergeyevsky, A. B.; Belbruno, E.; Sweetser, T. H.; Return to the Moon: The Lunar Observer Mission, Proceedings AAS/AAIA Astrodynamics Sp. Conf., Paper No. 90–288, August 1990, which we refer to as the Hohmann Inclination Change Method, or simply, H-ICM.

The comparisons are made for the case of changing the inclinations of a circular earth orbiting satellite at an altitude of 700 km. The inclination change for our example is for the case of going from $i_{E,1}=34°$ to $i_{E,2}=90°$ which implies $\Delta i_E = 56°$. The inclination of 34° is approximately for Vandenberg AFB in California. This kind of inclination change may be, for example, applicable to the satellites of the Teledesic network. The Iridium network also plans to put satellites into low circular polar orbits. It is calculated that for both the WSB-ICM and H-ICM, $\Delta V_1 = \Delta V_3 \approx 3.080$ km/s. From cook et al., $\Delta V_2 \approx 670$ m/s for the H-ICM. The WSB-ICM has $\Delta V_2 \approx 0$. The CM has a Delta-V of 7.050 km/s for the inclination change. Letting $\Delta V_1$ be the total Delta-V used for the inclination change, then we have for the WSB-ICM, H-ICM, CM the respective values, $\Delta V_f = 6.160$, 6.830, 7.050 km/s.

This yields the respective percentage savings, relative to the CM, of 13,3,0%. Thus, the WSB-ICM savings is substantially higher than the other two methods, i.e., approximately 13%. This is summarized in Tables 1 and 2 at the end of the specification. The WSB-ICM generally yields improvements to the CM when $\Delta i_E \geq 49°$ in the case of circular orbits at 700 km altitude, although savings for other $\Delta i_E$ may be possible. This typically critical value of $\Delta i_E$ depends on the altitude of periapsis and eccentricity of E1, E2.

Another interesting case is that of changing the inclination of a circular orbit at an altitude, of say 700 km, from 7 to 90 degrees. This would be applicable to the Arianne IV or V launch vehicle. In this case the CM yields the value of 9.945 km/s. The WSB-ICM reduces this by 38% to the same value in the previous paragraph, 6.160 km/s. This implies that the Arianne IV or V could be used with the same performance improvement of 13% by using the WSB-ICM to change inclination to 90° from 7°, as compared to the CM.

It is emphasized that the level of Delta-V improvements depends on the periapsis altitudes, eccentricities, and inclinations of E1, E2. It is remarked that when compared to the example given in Cook et al. for geotransfer type earth orbits, the WSB-ICM improved performance over the H-ICM by approximately 33%.

These savings in Delta-V when translated into spacecraft mass savings using the rocket equation, due to a decrease in propellant, imply that it may be possible for a given launch vehicle to carry more satellites. It is also possible that with a lighter payload, a smaller class of launch vehicle could be used. Both of these possibilities may have fiscal implications for the satellite networks being put up by the telecommunications industry.

Figure 17:
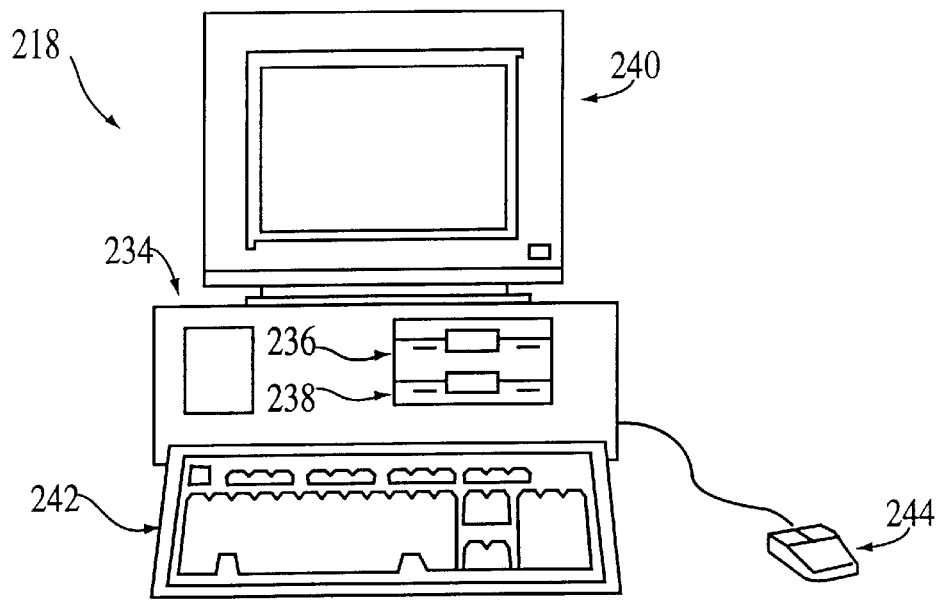
FIG. 17 is an illustration of main central processing unit for implementing the computer processing in accordance with one embodiment of the present invention.

FIG. 17 is an illustration of main central processing unit 218 for implementing the computer processing in accordance with one embodiment of the above described methods of the present invention. In FIG. 17, computer system 218 includes central processing unit 234 having disk drives 236 and 238. Disk drive indications 236 and 238 are merely symbolic of the number of disk drives which might be accommodated in this computer system. Typically, these would include a floppy disk drive such as 236, a hard disk drive (not shown either internally or externally) and a CD ROM indicated by slot 238. The number and type of drives varies, typically with different computer configurations. The computer includes display 240 upon which information is displayed. A keyboard 242 and a mouse 244 are typically also available as input devices via a standard interface.

Figure 18:
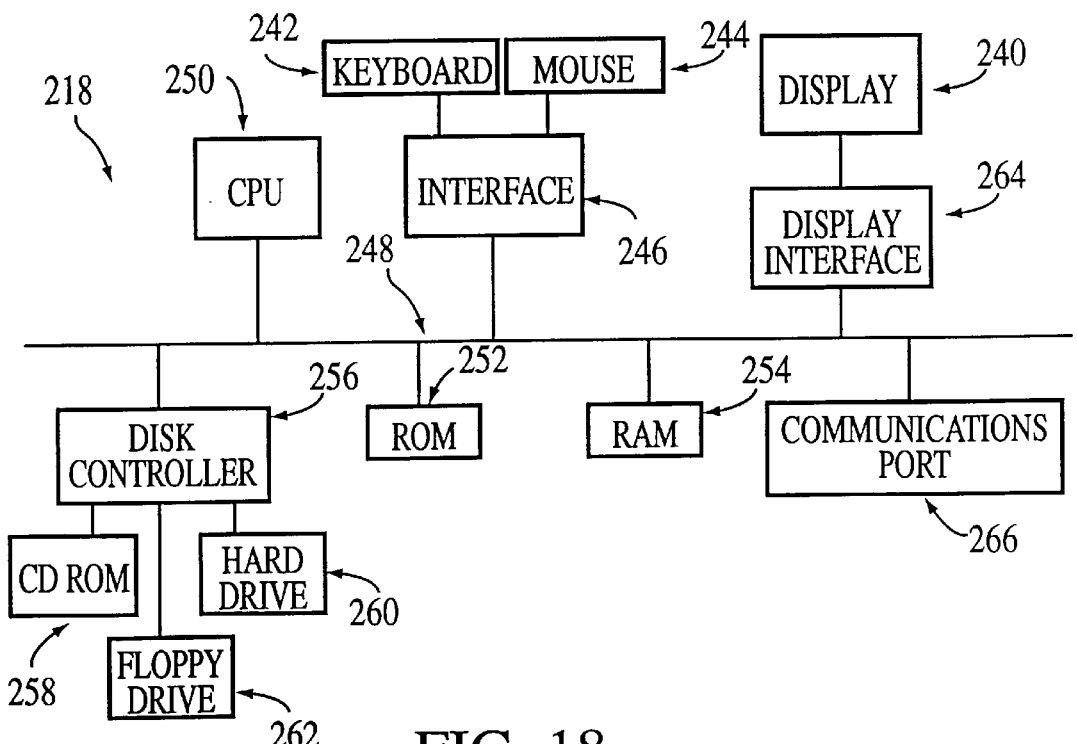
FIG. 18 is a block diagram of the internal hardware of the computer illustrated in FIG. 17.

FIG. 18 is a block diagram of the internal hardware of the computer 218 illustrated in FIG. 17. As illustrated in FIG. 18, data bus 248 serves as the main information highway interconnecting the other components of the computer system. Central processing units (CPU) 250 is the central processing unit of the system performing calculations and logic operations required to execute a program. Read-only memory 252 and random access memory 254 constitute the main memory of the computer, and may be used to store the simulation data.

Disk controller 256 interfaces one or more disk drives to the system bus 248. These disk drives may be floppy disk drives such as 262, internal or external hard drives such as 260, or CD ROM or DVD (digital video disks) drives such as 258. A display interface 264 interfaces with display 240 and permits information from the bus 248 to be displayed on the display 240. Similarly, interface 246, interfaces keyboard 242 and mouse 244 to bus 248. Communications with the external devices can occur on communications port 266.

Figure 19:
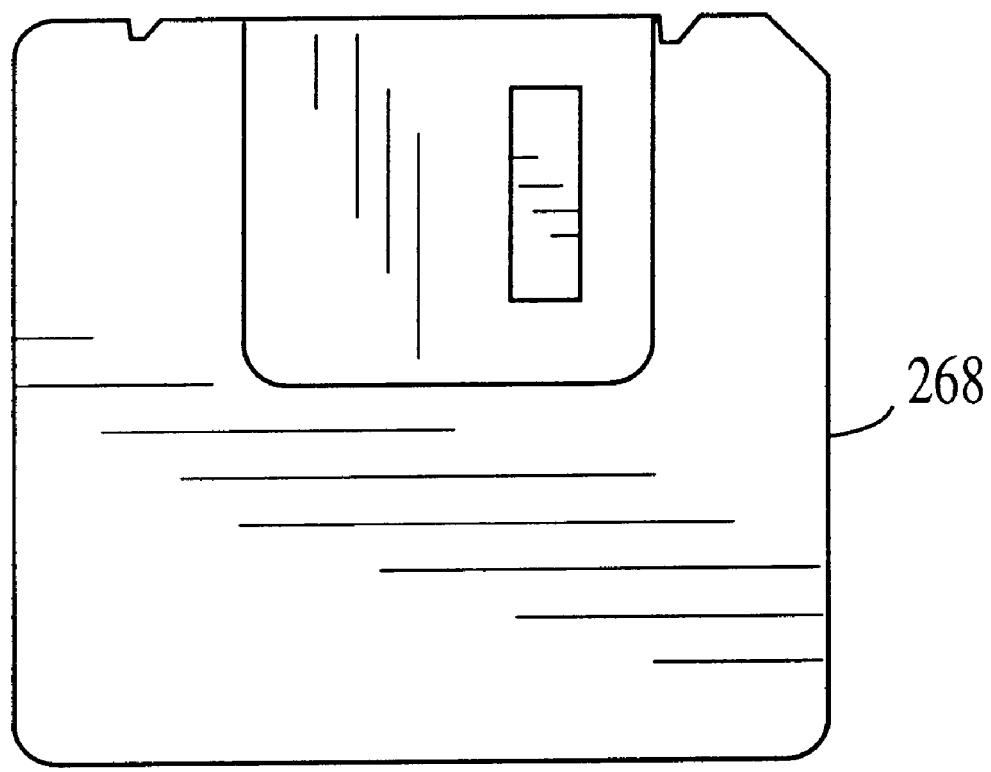
FIG. 19 is an illustration of an exemplary memory medium which can be used with disk drives illustrated in FIGS. 17–18.

FIG. 19 is an illustration of an exemplary memory medium (268) which can be used with disk drives such as 262 in FIG. 18 or 236 in FIG. 17. Typically, memory media such as a floppy disk, or a CD ROM, or a digital video disk will contain, inter alia, the program information for controlling the computer to enable the computer to perform the testing and development functions in accordance with the computer system described herein.

Although the processing system is illustrated having a single processor, a single hard disk drive and a single local memory, the processing system may suitably be equipped with any multitude or combination of processors or storage devices. The processing system may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference.

In alternate preferred embodiments, the above-identified processor, and in particular microprocessing circuit, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

It is remarked that the starting position from the earth for a BCT computed with this procedure can be at any altitude, suitable for any launch vehicle, the international space station Alpha, under development, the revolutionary single stage to orbit vehicle called Venture Star using a new type of rocket engine under development by Lockheed. Utilization of the FB region yields other low energy transfers to asteroids, Mars, and from these locations, using so called resonance hopping.

In summary, this forward targeting procedure to produce operational BCT's is substantially easier to use and faster than the backwards approach. It is a 2×2 procedure and makes the computation of BCT's a straight forward process, and it is robust. The BCT's can be computed for any starting positions with respect to the earth or arrival conditions at the moon.

Figure 3:
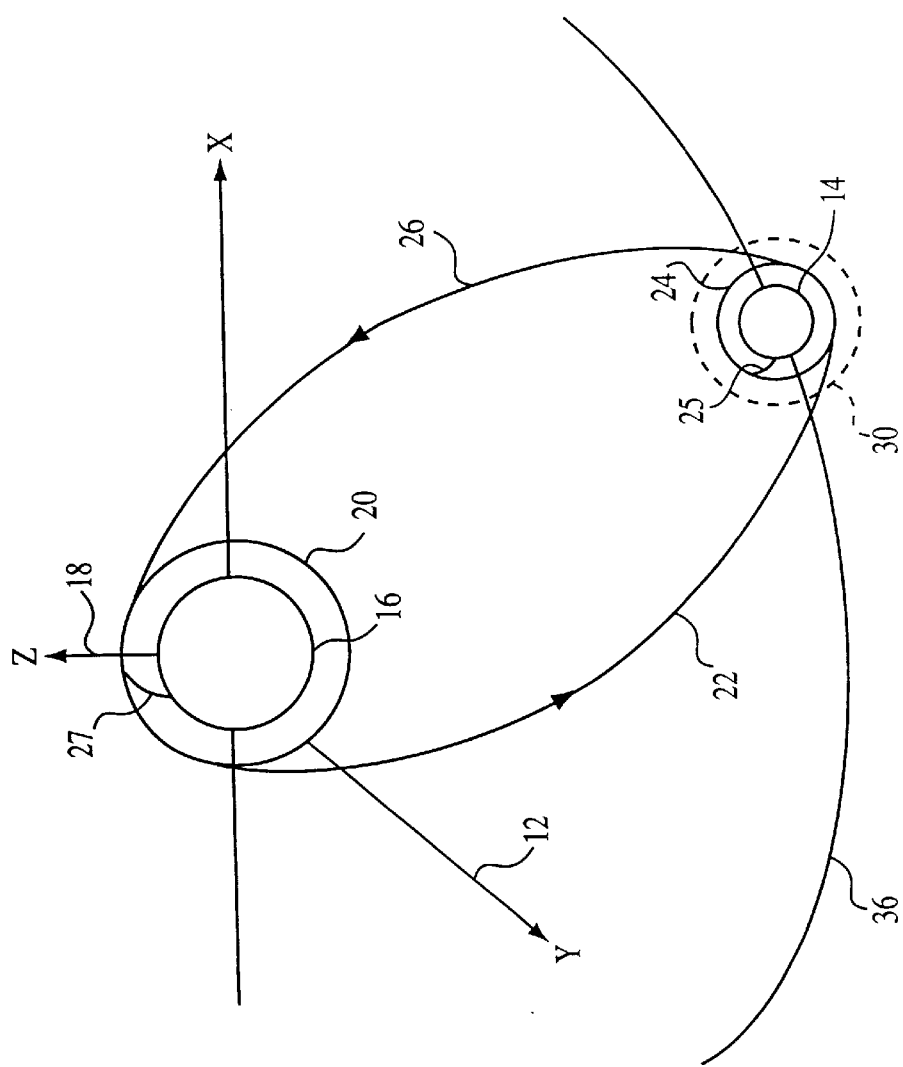
FIG. 3 is an illustration of an orbital system in accordance with a conventional lunar mission in a non-rotating coordinate system.
Figure 4:
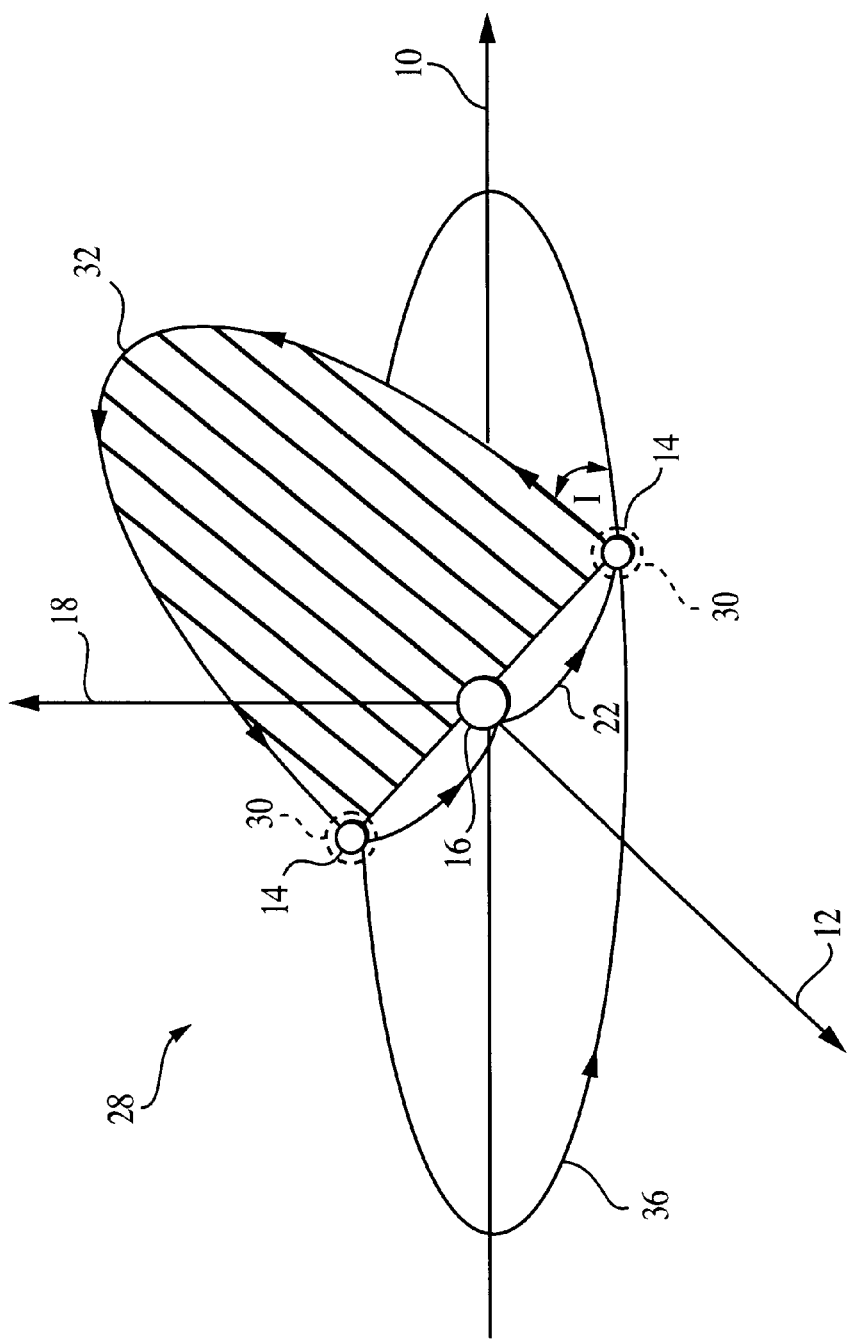
FIG. 4 is an illustration of another conventional orbital system.

As described previously, a way to substantially reduce the total Delta-V to change the inclination of an Earth orbiting satellite in an elliptic orbit was described above and in U.S. provisional patent application serial No. 60/041,465, filed Mar. 25, 1997, and corresponding PCT Application No. PCT/US98/05784, all incorporated herein by reference). This is referred to as the WSB Method, where WSB is an acronym for Weak Stability Boundary. The reduction was in comparison to the classical way of changing inclinations which is to perform a single deterministic maneuver, $\Delta V_I$, measured in km/s, at the periapsis of the initial elliptical orbit E1 of inclination $i_{E1}$, where the maneuver is done normal to the orbital plane. This forces E1 into another elliptical orbit E2 with the same eccentricity and periapsis altitude as E1, however, with a new inclination $i_{E2}$. This is shown in FIG. 3 in U.S. provisional patent application serial No. 60/041,465, and FIG. 14 in the present application.

By comparison, the WSB Method applies, for example, three maneuvers, $\Delta V_i$, i=1,2,3. The first is applied at the periapsis of E1 at altitude, $h_{E1}$, and eccentricity $e_{E1}$, in the direction of motion. This maneuver, $\Delta V_1$, sends the satellite to the Moon on a BCT which stands for Ballistic Capture Transfer. It arrives approximately 85 days later at the WSB in the desired lunar altitude, $h_L$, and inclination $i_L$. At a later time, the satellite is ejected from the Moon with a negligible maneuver $\Delta V_2 = 0$ and returns to the Earth on a BET after another approximately 85 days (BET stands for Ballistic Ejection Transfer). A final maneuver $\Delta V_2$ is done at the desired periapsis altitude $h_{E2}$ to put the satellite back in orbit about the Earth on an ellipse E2 of the desired inclination $i_{E2}$, and eccentricity $e_{E2}$. where, for generality, $h_{E2}, e_{E2}$ need not equal $h_{E1}, e_{E1}$ respectively. The total flight time is approximately 170 days.

Figure 5:
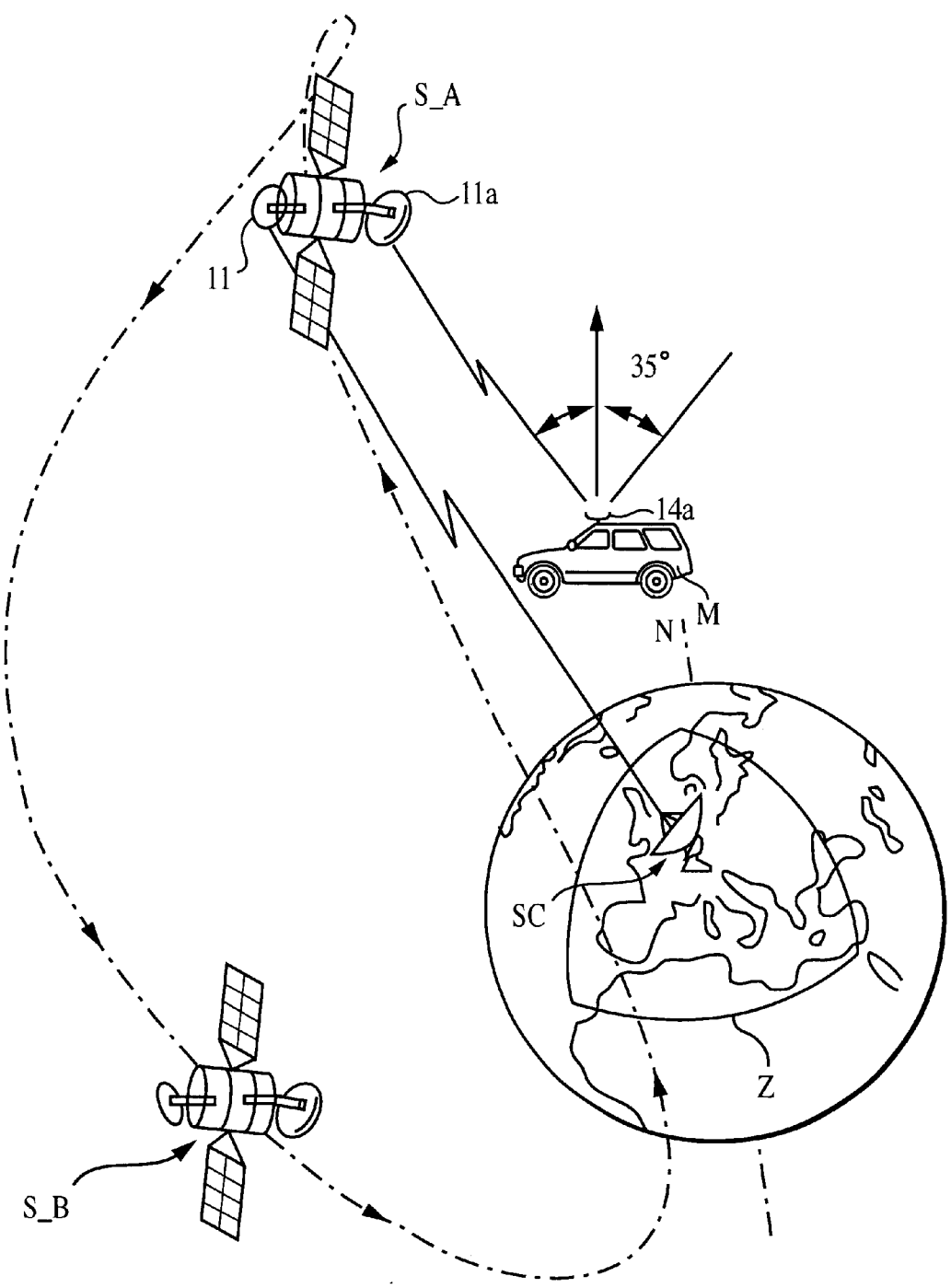
FIG. 5 is an illustration of another orbital system where, for example, satellites orbit the earth.
Figure 6:
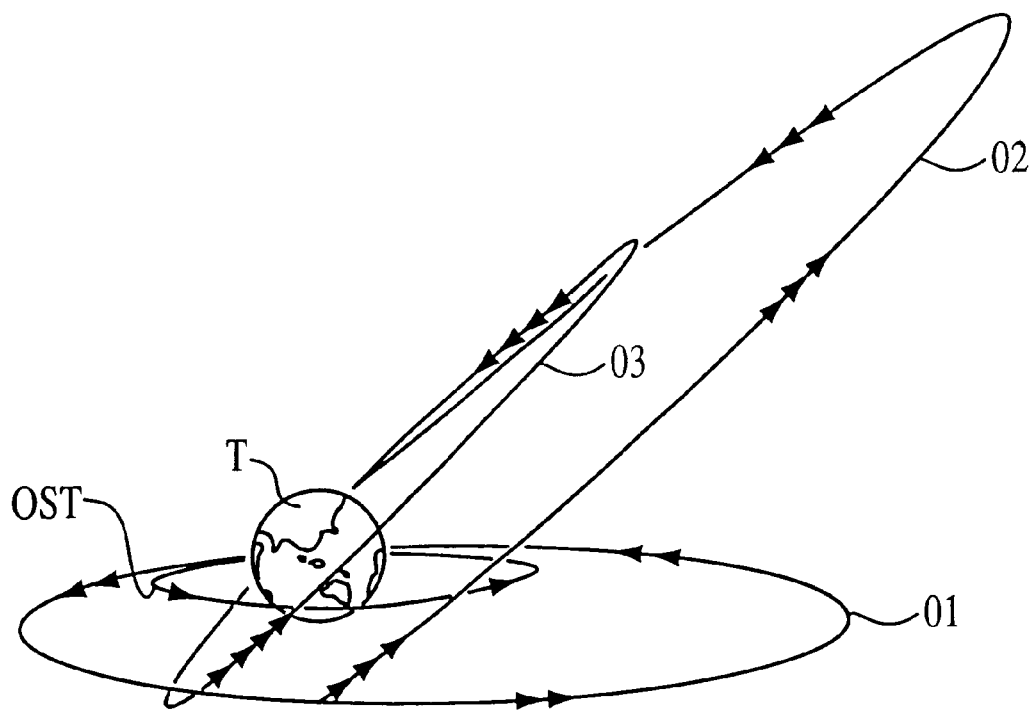
FIG. 6 is an illustration of another orbital system where, for example, satellites are placed in orbit about earth using the ARIANE IV rocket that requires three pulses.
Figure 7:
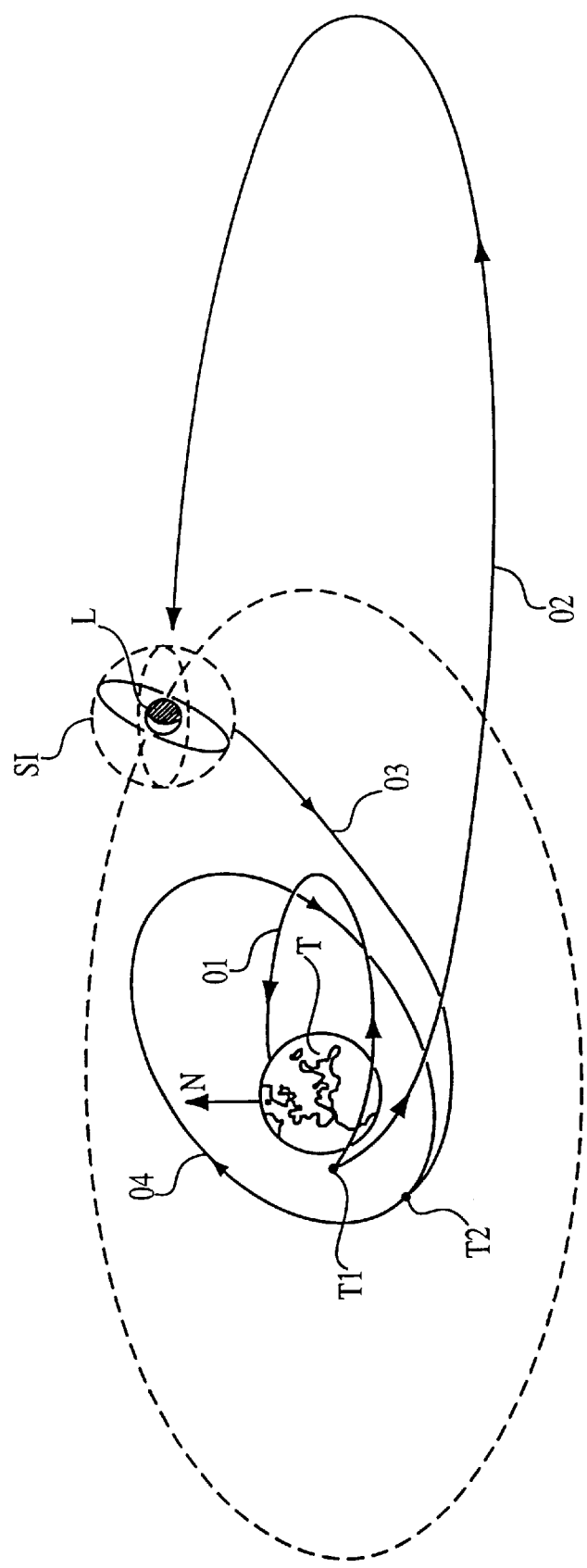
FIG. 7 is an illustration of another conventional lunar gravitational assistance transfer principle.

This procedure is shown, for example, in FIG. 5 of U.S. provisional patent application serial No. 60/041,465, and FIGS. 15–16b of the present application. In these figures, the eccentricities and periapsis altitudes of E1, E2, were preserved for simplicity. As was demonstrated previously, under certain conditions, $$\Sigma = \Delta V_1 + \Delta V_2 + \Delta V_3 < \Delta V_I.$$

This yields substantial savings in the total Delta-V in many situations. In the important application of, for example, changing the inclination from 34°, at Vandenberg AFB, to 90° for circular orbits at a fixed altitude of 700 km applicable to the telecommunications industry, the savings was 13% as compared to the classical method.

The value of 13% is large, and can translate into a significant savings in propellant or equivalently, mass. This in turn can lighten the satellite. A lighter satellite can give rise to a new design where the lighter and smaller satellite can be made. More satellites could be launched at once.

On the other hand, even without redesigning the satellites, a lighter satellite may allow the use of a smaller launch vehicle. Table 2 of U.S. provisional patent application serial No. 60/041,465 shows that an improvement of 36% in total Delta-V is made to change the inclination from 7° to 90° as compared with the standard method. This makes the Arianne launch vehicle competitive with those launched from Vandenberg.

An area for improvement in the WSB Method is the flight time of approximately 170 days. The WSB Method relies on my realization that the lunar WSB is a sensitive region where a satellite is at the boundary of lunar capture and escape. A satellite arriving there will be captured in an unstable fashion. This means that although its orbital state is elliptic, I have determined that the orbital state in the WSB is near parabolic. That is, the orbital state is near escape, or capture. This means, I have determined, that the standard Kepler two-body energy with respect to the Moon is negative and near zero. A satellite moving in this region does so in a chaotic fashion. A negligible Delta-V can therefore cause the satellite to be ejected. On the other hand, I have also determined that a negligible Delta-V can stabilize the satellite capture.

The WSB exists due to the gravitational interactions of the Earth and Moon. It represents a boundary region balancing the gravitational interactions on a moving satellite. (This is described in more detail in U.S. provisional patent application serial No. 60/036,864, filed Feb. 4, 1997, U.S. PCT Patent Application Ser. No. PCT/US98/01924, and the references given there, all of which are hereby incorporated by reference.)

Because the WSB is a sensitive place to move in, this sensitivity can be exploited to have a satellite ejected on a BET with negligible Delta-V back to any desired inclination with respect to the Earth. This is due to my design of a BET to travel out far enough from the Earth, for example, at approximately 1 million km (or other distances that achieve a substantially similar effect), so that the solar gravitational perturbations can act on the satellite long enough so that when it falls back to the Earth, a desired inclination can be achieved ($i_{E2}$). The ejection for or using a negligible or small Delta-V guarantees that $\Delta V_2 \approx 0$ or very small.

I have determined that the lunar WSB in physical three-dimensional space can be realized at a given altitude, and position, from the Moon, by specifying a critical or predetermined velocity magnitude. This, in turn, yields a critical or predetermined value of the capture eccentricity. For convenience, it is assumed that $h_L = 100$ km, although any altitude is possible. This implies that $e_L \approx 0.94$, for this example.

Also, I have determined that the WSB Method reduces the total Delta-V because to reach it, a BCT is used. This means that the capture Delta-V is approximately zero or relatively small. Another advantage of the WSB is that upon arrival at the Moon, a negligible Delta-V stabilizes the capture, and the satellite can be moved about the Moon in the WSB for negligible Delta-V for timing and positioning purposes prior to ejection. These properties yield the 13% Delta-V savings over the classical method described previously.

I have further discovered that a modification that can be made to improve the above techniques is to travel from the Earth, at the periapsis of E1, to the WSB of the Moon not on a BCT with a time of flight of 85 days, but on a standard Hohmann transfer with a time of flight of approximately 3 days. (This value of three days is used here as a nominal value. The time of flight of standard transfers to the Moon can vary from 3 or perhaps 8 days or more. Also, the Hohmann transfer may require a midcourse maneuver, which here we are not including.)

It is verified that at a lunar periapsis at 100 km altitude in the WSB, the satellite has a hyperbolic excess velocity of approximately 1 km/s. In order to be captured into the WSB state, a Delta-V must be applied to bring the eccentricity down to 0.94. I have determined that this requires approximately 0.200 km/s. This capture Delta-V is labeled, $\Delta V_c$. Thus, in the case of a BCT, $\Delta V_c = 0$, and for a Hohmann transfer, $\Delta V_c = 0.200$ km/s. The ejection using a BET to E2 is done as before, where $\Delta V_2 \approx 0$. The value of $\Delta V_1$ remains approximately the same as when a BCT was used. Since $\Delta V_3$ remains the same, I have determined that 0.200 km/s must be added into the Delta-V budget to the WSB method which is a penalty for using a Hohmann transfer to the Moon. Adding the 0.200 km/s to the total Delta-V for the WSB method yields 6.360 km/s required to change the inclination of an Earth orbiting satellite in a circular orbit at 700 km altitude from 34° to 90°.

Figure 20:
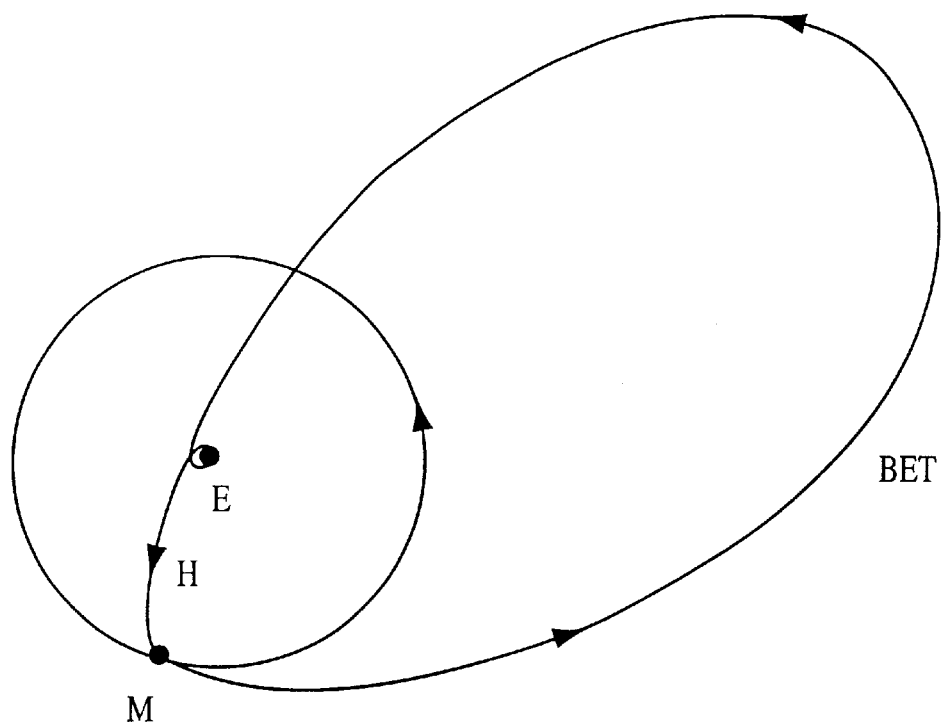
FIG. 20 is an illustration of another embodiment of the invention where an inclination change maneuver by bringing the spacecraft/satellite to ballistic capture at the moon on a Hohmann transfer, maneuvering around the moon in a WSB in an intermediate orbit, and then returning to Earth on a BET.

Thus, instead of a 13% reduction in Delta-V over the classical method, labeled C, the reduction becomes 10%, which still is a substantial savings. However, there is a large reduction of the time of flight-from 170 days to 88 days. This modified WSB method is referred to as the First Modified WSB Method or the M1-WSB Method (See FIG. 20). Its parameters are summarized in Table 1 in the present application.

Figure 21:
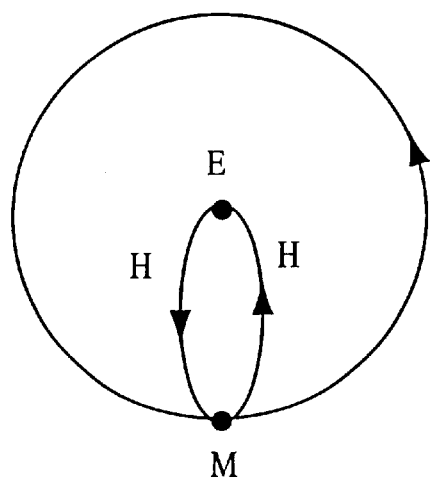
FIG. 21 is an illustration of another embodiment of the invention where an inclination change maneuver by bringing the spacecraft/satellite to ballistic capture at the moon on a Hohmann transfer, maneuvering around the moon in a WSB in an intermediate orbit, and then returning to Earth on another Hohmann.

I have further discovered that the modification in the previous paragraph can be taken one step further. In the M1-WSB Method, the satellite still returns to the Earth to the periapsis of E2 on a BET. The BET is ejected from the WSB with negligible Delta-V. To go back to the Earth more rapidly, more Delta-V is required for ejection to increase its escape velocity. To go back to the Earth on a standard Hohmann transfer from the lunar altitude of 100 km where the osculating eccentricity is 0.94, requires a Delta-V of 0.200 km/s, yielding a symmetric transfer as the one arriving from the Earth in the M1-WSB Method. Now, $\Delta V_2 = 0.200$ k/m/s. Adding this to the total Delta-V of the WSB Method in Table 1 yields a Delta-V of 6.560 km/s. This is a 7% improvement over the classical method which is still significant. However, the total time of flight has been reduced from 88 days in the M1-WSB Method to only 6 days. This method is referred to as the Second Modified WSB Method or the M2-WSB Method (See FIG. 21 and Table 1).

The methods, WSB, M1-WSB, M2-WSB, C are compared in Table 1. Symbolically, they can be represented by the following:

WSB: E1→BCT→WSB→BET→E2
M1 WSB: E1→H→WSB→BET→E2
M2 WSB: E1→H→WSB→H→E2,
where H represents the Hohmann transfer.

M1-WSB is probably the most flexible method. This is because of the use of a BET on return. Because the BET is a sensitive trajectory, influenced by the solar gravitational perturbations, the ability to achieve arbitrary inclinations at the Earth for E2 are easier to accomplish. The ability to achieve an arbitrary inclination at the Earth from a returning Hohmann transfer may have restrictive timing issues because the Hohmann transfer is not influenced by solar gravitational perturbations.

Under the M2-WSB, the Hohmann transfer from the Moon to the Earth is moving mainly within the Earth-Moon distance or gravitational influence, and is not far enough away so that the Sun can be used to alter its arriving Earth inclination. Therefore, unless the timing is ideal, a large midcourse maneuver may be needed to achieve the desired Earth inclination. Thus, the M2-WSB method in some situations may be quite restrictive. The BET has timing issues as well, however, experience has shown that such transfers are more flexible than Hohmann transfers, and midcourse maneuvers due to nondesired timing issues are generally quite small. Here, we have assumed they are zero which is usually the case.

The software and the algorithm required to compute the BCT, and/or BET is the same as is described in the previous incorporated by reference application. This is in stand alone source code and is described fully therein as well. The software described in the previous applications also computes the standard Hohmann Transfer using the same identical algorithm.

All of the above methods, WSB, M1-WSB, M2-WSB, which for brevity are referred to simply as WSB Methods, make intimate use of the WSB. As was described above, the WSB's nonlinear nature and being at the boundary of capture and escape, allow capture and escape to occur for substantially zero or relatively small Delta-V. This, together with the solar gravitational perturbations allow the BET and BCT to exist. The WSB exists due to the mutual gravitational interactions of the Earth and Moon. Thus, when modeling the motion of a satellite in this region, both the Earth and the Moon must both be gravitationally modeled. This is because the WSB may be viewed as the boundary of interaction of these two gravitational fields as the satellite moves.

If one calculated the energy of the satellite with respect to the Moon (the so called Kepler two-body energy) as it moved in the WSB, it would be slightly negative and near to zero. I have determined that the fact it is slightly negative means that the satellite is weakly captured. The fact that it is near to zero, means that the satellite is near to escape. Another feature of the WSB not reflected in this two-body Kepler energy is that a negligible maneuver can actually stabilize the motion so that although the energy is near to zero, a tiny decrease in the negative energy will prevent it from easily escaping. Thus, the WSB is 'thin' in width—in the position velocity space. Thin means that a tiny velocity change will stabilize the motion, and thus move the satellite out of the WSB.

The fact, which I have determined, that the WSB exists only in the three-body dynamic modeling of the Earth-Moon-Satellite, together with its Kepler lunar energy near zero, and negative, means that the satellite's motion at the WSB is completely different than the motion of a satellite as it is doing a gravity assist using the Moon. When a satellite flies by the Moon to get a gravity assist, the modeling for this is only between the Moon and the satellite. This is all that it is necessary to calculate the gravity assist maneuver. Thus, the satellite is not near the WSB for the standard gravity assist in the position-velocity space which requires the Earth modeling as well.

Another difference between the presently disclosed WSB methods and a standard gravity assist is also seen due to the fact that when a satellite flies by the Moon when doing a gravity assist, it has substantially positive Kepler energy with respect to the Moon. That is, the motion must be hyperbolic. This is just the opposite for the motion in the WSB which is negative and near zero. That is, the motion in the WSB is elliptic and parabolic. The motion in the WSB cannot be modeled omitting the gravitational influence of the Earth, since the WSB would not exist. Thus, the motion in the WSB cannot be modeled in the two-body way between the satellite and Moon, and hence is distinct from the motion a satellite has while performing a lunar gravity assist.

The above shows that the WSB Methods are distinct from any methods using gravity assist. This even includes the M2-WSB case which uses Hohmann transfers because the satellite goes to the WSB. This implies that the M2-WSB method is distinct from the standard method that only utilizes gravity assist at the Moon.

It is finally emphasized that BCT is the lowest energy route to the Moon, and the Hohmann transfer is the highest. The BCT is the lowest because it arrives in ballistic capture which means no capture maneuver is required. Besides the BCT, or BET, as described above, there may be family of transfers which lie between the Hohmann and the BCT or BET. These transfers would have time of flights greater than the Hohmann Transfer and shorter than the BCT or BET. They would also require values of $\Delta V_c$ that would between zero and the value used by the Hohmann Transfer. Similarly, in the case of the BET, $\Delta V_2$ would lie between zero and the Hohmann value.

The many features and advantages of the invention are apparent from the detailed specification, and thus, it is intended by the appended claims to cover all such features and advantages of the invention which fall within the true spirit and scope of the invention.

For example, while I have described the above computer implemented processes with reference to placing a satellite in orbit around the earth at a predetermined inclination, the above described technique is applicable or relevant to any object that requires inclination changes and/or maneuvers to be placed in orbit around the earth or other planet, body in space, and/or effect in space simulating or providing orbit like characteristics. That is, the technique/method described herein may be used regardless of object type and/or inclination change. The technique described herein may be used as a new computer generated route for travel between two points in space. In addition, the above techniques apply in the reverse situation of placing an object in orbit around the moon when the object emanates from the moon or moon orbit. For example, the object may be launched from the moon, travel to the WSB, perform a maneuver and/or inclination change, and then returned to a suitable orbit around the moon.

Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Recent planned missions for the remainder of this decade show that the BCT is becoming the route of choice. Japan plans to use it again in 1998 on the so called Lunar-A mission, and the US Air Force Academy plans to use it in 1998–1999 for the so called Blue Moon mission. In fact, components of the Blue Moon mission will be tested in space on a launch of an Atlas rocket on Oct. 21, 1997 from Cape Canaveral. of the five lunar missions from 1991–1999, three are using the BCT.

The future for lunar development looks very promising. In the next 10 years, there is projected to be billions of dollars spent on lunar missions. Use of the BCT can cut this cost in half, or equivalently, potentially be the transfer of choice and be responsible for billions of dollars in lunar missions.

There have been three very important developments which imply that from 1999 on, there should be regular and frequent lunar missions, a small lunar base in about 10 years and then large scale commercial projects.

1. In July 1996, Lockheed was awarded a 1 billion dollar contract to develop a ⅓ scale version of a single stage to orbit rocket using the aerospike engine. This is the so called X-33 rocket. It will revolutionize space travel and make flying into space as routine as flying a jet. The smaller version is to be ready in 1998, and the full scale version in 2002. It is called the Venture Star, and NASA has said it plans to replace its shuttle fleet with them. Smaller versions will no doubt be commercially available and open up space for the public.

2. In November 1996, water in large easily accessible quantities was discovered on the moon in the south polar regions. This means that development of the moon is very likely. This is because water gives a self-sustaining capability.

3. The international space station Alpha starts to go up in Fall of 1997, and is to be completed in 2001. This will give a large scale permanent presence in space, and the station can be used as a launching platform.

There are already two lunar missions being planned for 2000, 2001 to investigate the lunar water further, and a lot of talk about a small lunar base. After the Venture Star gets rolling, commercial lunar development is sure to follow with hotels, etc. In fact, Mitsubishi, and other large Japanese corporations have discussed large hotel complexes.

TABLE 1

Delta-V's to change inclination from 34 to 90 degrees, E1 → E2. E1, E2 circular orbits at 700 km altitude. All Delta-V's, km/s. WSB is defined for a capture periapsis altitude of 100 km, where e = .94.

| Method | $\Delta V_1$ | $\Delta V_C$ | $\Delta V_2$ | $\Delta V_3$ | Total $\Delta V$ | Savings wrt C (%) | Flight Time (Days) |
|---|---|---|---|---|---|---|---|
| WSB | 3.080 | 0 | 0 | 3.080 | 6.160 | 13 | 170 |
| M1-WSB | 3.080 | .200 | 0 | 3.080 | 6.360 | 10 | 88 |
| M2-WSB | 3.080 | .200 | .200 | 3.080 | 6.560 | 7 | 6 |
| C | — | — | — | — | 7.050 | 0 | 3 |

What is claimed is:

1. A method of changing at least one of an inclination and an altitude of an object including at least one of a space vehicle, satellite and rocket by generating a combination Hohmann transfer for the object emanating substantially at earth or earth orbit to arrive at a weak stability boundary (WSB) or WSB orbit at or near the moon or moon orbit and generating an operational ballistic ejection transfer (BET) for the object emanating at the WSB or the WSB orbit to return to the earth or the earth orbit, using a computer implemented process, comprising the sequential or non-sequential steps of:

(a) generating the Hohmann transfer for convergence of first target variables at the WSB or the WSB orbit;

(b) traveling from the earth or the earth orbit to a weak lunar capture in the WSB or the WSB orbit using the Hohmann transfer;

(c) optionally performing an inclination change at the WSB or the WSB orbit;

(d) generating the BET for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the operational ballistic ejection transfer, wherein said generating step (d) further comprises the step of generating the BET using a forward targeting process for convergence of the second target variables at the earth or the earth orbit from the WSB or the WSB orbit, optionally including the inclination change performed in step (c).

2. A method of changing at least one of an inclination and an altitude of an object including at least one of a space vehicle, satellite and rocket by generating a combination Hohmann transfer for the object emanating substantially at earth or earth orbit to arrive at a weak stability boundary (WSB) or WSB orbit at or near the moon or moon orbit and generating an operational ballistic ejection transfer (BET) for the object emanating at the WSB or the WSB orbit to return to the earth or the earth orbit, using a computer implemented process, comprising the sequential or non-sequential steps of:

(a) generating the Hohmann transfer for convergence of first target variables at the WSB or the WSB orbit;

(b) traveling from the earth or the earth orbit to a weak lunar capture in the WSB or the WSB orbit using the Hohmann transfer;

(c) optionally performing an inclination change at the WSB or the WSB orbit;

(d) generating the BET for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the operational ballistic ejection transfer, wherein the second target variables are decoupled from the earth or the earth orbit in said step (d) of generating the BET.

3. A method of changing at least one of an inclination and an altitude of an object including at least one of a space vehicle, satellite and rocket by generating a combination Hohmann transfer for the object emanating substantially at earth or earth orbit to arrive at a weak stability boundary (WSB) or WSB orbit at or near the moon or moon orbit and generating an operational ballistic ejection transfer (BET) for the object emanating at the WSB or the WSB orbit to return to the earth or the earth orbit, using a computer implemented process, comprising the sequential or non-sequential steps of:

(a) generating the Hohmann transfer for convergence of first target variables at the WSB or the WSB orbit;

(b) traveling from the earth or the earth orbit to a weak lunar capture in the WSB or the WSB orbit using the Hohmann transfer;

(c) optionally performing an inclination change at the WSB or the WSB orbit;

(d) generating the BET for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the operational ballistic ejection transfer, wherein the second target variables are decoupled from angular moon elements in said step (d) of generating the BET.

4. A method of changing at least one of an inclination and an altitude of an object including at least one of a space vehicle, satellite and rocket by generating a combination Hohmann transfer for the object emanating substantially at earth or earth orbit to arrive at a weak stability boundary (WSB) or WSB orbit at or near the moon or moon orbit and generating an operational ballistic ejection transfer (BET) for the object emanating at the WSB or the WSB orbit to return to the earth or the earth orbit, using a computer implemented process, comprising the sequential or non-sequential steps of:

(a) generating the Hohmann transfer for convergence of first target variables at the WSB or the WSB orbit;

(b) traveling from the earth or the earth orbit to a weak lunar capture in the WSB or the WSB orbit using the Hohmann transfer;

(c) optionally performing an inclination change at the WSB or the WSB orbit;

(d) generating the BET for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the operational ballistic ejection transfer, wherein at least one of the Hohmann transfer and the operational ballistic ejection transfer are dynamically generated in the at least one of the space vehicle, the satellite, and the rocket.

5. A method of changing at least one of an inclination and an altitude of an object including at least one of a space vehicle, satellite and rocket by generating a combination operational ballistic capture transfer (BCT) for the object emanating substantially at earth or earth orbit to arrive at a weak stability boundary (WSB) or WSB orbit at or near the moon or moon orbit and generating a Hohmann transfer for the object emanating at the WSB or the WSB orbit to return to the earth or the earth orbit, using a computer implemented process, comprising the sequential or non-sequential steps of:

(a) generating the BCT for convergence of first target variables at the WSB or the WSB orbit;

(b) traveling from the earth or the earth orbit to a weak lunar capture in the WSB or the WSB orbit using the BCT;

(c) optionally performing an inclination change at the WSB or the WSB orbit;

(d) generating the Hohmann transfer for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the Hohmann transfer, wherein said generating step (a) further comprises the step of generating the BCT using a forward targeting process for convergence of the first target variables at the WSB or the WSB orbit from the earth or the earth orbit, optionally including the inclination change performed in step (c).

6. A method of changing at least one of an inclination and an altitude of an object including at least one of a space vehicle, satellite and rocket by generating a combination operational ballistic capture transfer (BCT) for the object emanating substantially at earth or earth orbit to arrive at a weak stability boundary (WSB) or WSB orbit at or near the moon or moon orbit and generating a Hohmann transfer for the object emanating at the WSB or the WSB orbit to return to the earth or the earth orbit, using a computer implemented process, comprising the sequential or non-sequential steps of:

(a) generating the BCT for convergence of first target variables at the WSB or the WSB orbit;

(b) traveling from the earth or the earth orbit to a weak lunar capture in the WSB or the WSB orbit using the BCT;

(c) optionally performing an inclination change at the WSB or the WSB orbit;

(d) generating the Hohmann transfer for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the Hohmann transfer, wherein the first target variables are decoupled from the moon or the moon orbit in said step (a) of generating the BCT.

7. A method of changing at least one of an inclination and an altitude of an object including at least one of a space vehicle, satellite and rocket by generating a combination operational ballistic capture transfer (BCT) for the object emanating substantially at earth or earth orbit to arrive at a weak stability boundary (WSB) or WSB orbit at or near the moon or moon orbit and generating a Hohmann transfer for the object emanating at the WSB or the WSB orbit to return to the earth or the earth orbit, using a computer implemented process, comprising the sequential or non-sequential steps of:

(a) generating the BCT for convergence of first target variables at the WSB or the WSB orbit;

(b) traveling from the earth or the earth orbit to a weak lunar capture in the WSB or the WSB orbit using the BCT;

(c) optionally performing an inclination change at the WSB or the WSB orbit;

(d) generating the Hohmann transfer for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the Hohmann transfer, wherein the first target variables are decoupled from angular earth elements in said step (a) of generating the BCT.

8. A method of changing at least one of an inclination and an altitude of an object including at least one of a space vehicle, satellite and rocket by generating a combination operational ballistic capture transfer (BCT) for the object emanating substantially at earth or earth orbit to arrive at a weak stability boundary (WSB) or WSB orbit at or near the moon or moon orbit and generating a Hohmann transfer for the object emanating at the WSB or the WSB orbit to return to the earth or the earth orbit, using a computer implemented process, comprising the sequential or non-sequential steps of:

(a) generating the BCT for convergence of first target variables at the WSB or the WSB orbit;

(b) traveling from the earth or the earth orbit to a weak lunar capture in the WSB or the WSB orbit using the BCT;

(c) optionally performing an inclination change at the WSB or the WSB orbit;

(d) generating the Hohmann transfer for convergence of second target variables at the earth or the earth orbit from the WSB or the WSB orbit, optionally including the inclination change performed in step (c); and (e) traveling from the WSB or the WSB orbit to the earth or the earth orbit at a predetermined arbitrary altitude using the Hohmann transfer, wherein at least one of the Hohmann transfer and the operational ballistic capture transfer are dynamically generated in the at least one of the space vehicle, the satellite, and the rocket.

9. A method of changing at least one of an inclination and an altitude of an object including at least one of a space vehicle, satellite and rocket, using a computer implemented process, comprising the sequential or non-sequential steps of:

(a) traveling from the earth or the earth orbit to a weak lunar capture in a weak stability boundary (WSB) or WSB orbit using at least one of an operational ballistic capture transfer (BCT) and a first Hohmann transfer;

(b) performing at least one of a maneuver and a negligible maneuver, and optionally performing an inclination change at the WSB or the WSB orbit; and (c) traveling from the WSB or the WSB orbit to the earth or the earth orbit at a predetermined arbitrary altitude and optionally at the inclination change using at least one of an operational ballistic ejection transfer (BET) and a second Hohmann transfer, wherein the at least one of the WSB or the WSB orbit is realizable at the predetermined arbitrary altitude by specifying a predetermined velocity magnitude of the object, thereby defining a predetermined capture eccentricity.

10. A method of generating operational ballistic capture transfer for an object emanating substantially at a first plant or first planet orbit to arrive at a second planet or second planet orbit using a computer implemented process, comprising the steps of:

(a) entering parameters for said method of generating operational ballistic capture transfer;

(b) implementing a forward targeting process by varying the parameters for convergence of target variables at the second planet from the first planet; and (c) iterating step (b) until sufficient convergence to obtain the operational ballistic capture transfer from the first planet or the first planet orbit to the second planet or the second planet orbit.

11. A method of changing at least one of an inclination and an altitude of an object including at least one of a space vehicle, satellite and rocket, using a computer implemented process, comprising the sequential, non-sequential or sequence independent steps of:

(a) traveling using a first transfer from a first heavenly body or a first heavenly body orbit to a weak capture in a weak stability boundary (WSB) or WSB orbit associated with said first heavenly body;

(b) performing at least a negligible maneuver and optionally performing an inclination change at the WSB or the WSB orbit and ejecting therefrom; and (c) traveling using a second transfer from the WSB or the WSB orbit to at least one of the first heavenly body or the first heavenly body orbit and a second heavenly body or a second heavenly body orbit at a predetermined arbitrary altitude and optionally at the inclination change, wherein the first transfer comprises an operational ballistic capture transfer (BCT), and wherein said traveling step (a) further comprises the step of traveling using the BCT from the first heavenly body or the first heavenly body orbit to the weak capture in the weak stability boundary (WSB) or the WSB orbit associated with said first heavenly body by implementing a forward targeting process by varying parameters for said method until convergence of target variables at the WSB or the WSB orbit.

12. A method of changing at least one of an inclination and an altitude of an object including at least one of a space vehicle, satellite and rocket, using a computer implemented process, comprising the sequential, non-sequential or sequence independent steps of:

(a) traveling using a first transfer from a first heavenly body or a first heavenly body orbit to a weak capture in a weak stability boundary (WSB) or WSB orbit associated with said first heavenly body;

(b) performing at least a negligible maneuver and optionally performing an inclination change at the WSB or the WSB orbit and ejecting therefrom; and (c) traveling using a second transfer from the WSB or the WSB orbit to at least one of the first heavenly body or the first heavenly body orbit and a second heavenly body or a second heavenly body orbit at a predetermined arbitrary altitude and optionally at the inclination change, wherein the first transfer comprises an operational ballistic capture transfer (BCT), and wherein said traveling step (a) further comprises the step of traveling using the BCT from the first heavenly body or the first heavenly body orbit to the weak capture in the weak stability boundary (WSB) or the WSB orbit associated with said first heavenly body by implementing a forward targeting process by varying the at least two spherical parameters for convergence of target variables at the WSB or the WSB orbit, while maintaining at least one classical variable used in said forward targeting process substantially fixed.

13. A method of changing at least one of an inclination and an altitude of an object including at least one of a space vehicle, satellite and rocket, using a computer implemented process, comprising the sequential, non-sequential or sequence independent steps of:

(a) traveling using a first transfer from a first heavenly body or a first heavenly body orbit to a weak capture in a weak stability boundary (WSB) or WSB orbit associated with said first heavenly body;

(b) performing at least a negligible maneuver and optionally performing an inclination change at the WSB or the WSB orbit and ejecting therefrom; and (c) traveling using a second transfer from the WSB or the WSB orbit to at least one of the first heavenly body or the first heavenly body orbit and a second heavenly body or a second heavenly body orbit at a predetermined arbitrary altitude and optionally at the inclination change, wherein the first transfer comprises an operational ballistic capture transfer (BCT), and wherein said traveling step (a) further comprises the step of traveling using the BCT from the first heavenly body or the first heavenly body orbit to the weak capture in the weak stability boundary (WSB) or the WSB orbit associated with said first heavenly body by implementing a forward targeting process by varying velocity magnitude $V_E$, and flight path angle $\gamma_E$ for convergence of target variables at the WSB or the WSB orbit, the target variables including radial distance, $r_M$, and inclination $i_M$.

14. A method of changing at least one of an inclination and an altitude of an object including at least one of a space vehicle, satellite and rocket, using a computer implemented process, comprising the sequential, non-sequential or sequence independent steps of:

(a) traveling using a first transfer from a first heavenly body or a first heavenly body orbit to a weak capture in a weak stability boundary (WSB) or WSB orbit associated with said first heavenly body;

(b) performing at least a negligible maneuver and optionally performing an inclination change at the WSB or the WSB orbit and ejecting therefrom; and (c) traveling using a second transfer from the WSB or the WSB orbit to at least one of the first heavenly body or the first heavenly body orbit and a second heavenly body or a second heavenly body orbit at a predetermined arbitrary altitude and optionally at the inclination change,
  wherein the first transfer comprises an operational ballistic capture transfer (BCT), and wherein said traveling step (a) further comprises the step of traveling using the first transfer from the first heavenly body or the first heavenly body orbit to the weak capture in the weak stability boundary (WSB) or the WSB orbit associated with said first heavenly body by implementing a forward targeting process comprising a second order Newton algorithm, and wherein the second order Newton algorithm utilizes two control variables including velocity magnitude $V_E$, and flight path angle $\gamma_E$ that are varied to achieve WSB conditions at the second heavenly body or the second heavenly body orbit using two target variables including radial distance, $r_M$, and inclination $i_M$.

15. A method according to claim 14, wherein the velocity magnitude $V_E$, and the flight path angle $\gamma_E$ are decoupled from the second heavenly body or the second heavenly body orbit in the first transfer.

16. A method according to claim 14, wherein the velocity magnitude $V_E$, and the flight path angle $\gamma_E$ are decoupled from angular elements of the first heavenly body including inclination $i_E$, ascending node relative to earth $\Omega_E$, and argument of periapsis relative to the first heavenly body $\omega_E$.

17. A method of changing at least one of an inclination and an altitude of an object including at least one of a space vehicle, satellite and rocket, using a computer implemented process, comprising the sequential, non-sequential or sequence independent steps of:
  (a) traveling using a first transfer from a first heavenly body or a first heavenly body orbit to a weak capture in a weak stability boundary (WSB) or WSB orbit associated with said first heavenly body;
  (b) performing at least a negligible maneuver and optionally performing an inclination change at the WSB or the WSB orbit and ejecting therefrom; and
  (c) traveling using a second transfer from the WSB or the WSB orbit to at least one of the first heavenly body or the first heavenly body orbit and a second heavenly body or a second heavenly body orbit at a predetermined arbitrary altitude and optionally at the inclination change,
    wherein the at least one of the WSB or the WSB orbit is realizable at the predetermined arbitrary altitude by specifying a predetermined velocity magnitude of the at least one of a space vehicle, satellite and rocket, thereby defining a predetermined capture eccentricity.

18. A method of changing at least one of an inclination and an altitude of an object including at least one of a space vehicle, satellite and rocket, using a computer implemented process, comprising the sequential, non-sequential or sequence independent steps of:
  (a) traveling using a first transfer from a first heavenly body or a first heavenly body orbit to a weak capture in a weak stability boundary (WSB) or WSB orbit associated with said first heavenly body;
  (b) performing at least a negligible maneuver and optionally performing an inclination change at the WSB or the WSB orbit and ejecting therefrom; and
  (c) traveling using a second transfer from the WSB or the WSB orbit to at least one of the first heavenly body or the first heavenly body orbit and a second heavenly body or a second heavenly body orbit at a predetermined arbitrary altitude and optionally at the inclination change,
    wherein the second transfer comprises an operational ballistic ejection transfer (BET), and wherein said traveling step (c) further comprises the step of traveling using the BET from the weak capture in the weak stability boundary (WSB) or the WSB orbit to the at least one of the first heavenly body or the first heavenly body orbit and the second heavenly body or the second heavenly body orbit by implementing a forward targeting process by varying second parameters for said method until convergence of second target variables at the WSB or the WSB orbit.

19. A method according to claim 18, wherein the second target variables are decoupled from at least one of the first heavenly body or the first heavenly body orbit and angular second heavenly body elements.

20. A satellite placed in orbit at least one of an inclination and an altitude using a computer implemented or computer assisted process, comprising the sequential, non-sequential or sequence independent steps of:
  (a) traveling using a first Hohmann transfer from a first heavenly body or a first heavenly body orbit to a weak capture in a weak stability boundary (WSB) or WSB orbit associated with said first heavenly body;
  (b) performing at least a negligible maneuver and optionally performing an inclination change at the WSB or the WSB orbit and ejecting therefrom; and
  (c) traveling using a second Hohmann transfer from the WSB or the WSB orbit to at least one of the first heavenly body or the first heavenly body orbit and a second heavenly body or a second heavenly body orbit at a predetermined arbitrary altitude and optionally at the inclination change,
    wherein the at least one of the WSB or the WSB orbit is realizable at the predetermined arbitrary altitude by specifying a predetermined velocity magnitude of the at least one of a space vehicle, satellite and rocket, thereby defining a predetermined capture eccentricity.

21. A satellite placed in orbit at least one of an inclination and an altitude using a computer implemented or computer assisted process, comprising the sequential, non-sequential or sequence independent steps of:
  (a) traveling using a first transfer from a first heavenly body or a first heavenly body orbit to a weak capture in a weak stability boundary (WSB) or WSB orbit associated with said first heavenly body;
  (b) performing at least a negligible maneuver and optionally performing an inclination change at the WSB or the WSB orbit and ejecting therefrom; and
  (c) traveling using a second transfer from the WSB or the WSB orbit to at least one of the first heavenly body or the first heavenly body orbit and a second heavenly body or a second heavenly body orbit at a predetermined arbitrary altitude and optionally at the inclination change,
    wherein the at least one of the WSB or the WSB orbit is realizable at the predetermined arbitrary altitude by specifying a predetermined velocity magnitude of the at least one of a space vehicle, satellite and rocket, thereby defining a predetermined capture eccentricity.

22. A satellite placed in orbit at least one of an inclination and an altitude using a computer implemented or computer assisted process, comprising the sequential, non-sequential or sequence independent steps of:

(a) traveling from the earth or the earth orbit to a weak lunar capture in a weak stability boundary (WSB) or WSB orbit using at least one of an operational ballistic capture transfer (BCT) and a first Hohmann transfer;

(b) performing at least one of a maneuver and a negligible maneuver, and optionally performing an inclination change at the WSB or the WSB orbit; and (c) traveling from the WSB or the WSB orbit to the earth or the earth orbit at a predetermined arbitrary altitude and optionally at the inclination change using at least one of an operational ballistic ejection transfer (BET) and a second Hohmann transfer, wherein the at least one of the WSB or the WSB orbit is realizable at the predetermined arbitrary altitude by specifying a predetermined velocity magnitude of the object, thereby defining a predetermined capture eccentricity.

* * * * *

UNITED STATES PATENT AND TRADEMARK OFFICE
CERTIFICATE OF CORRECTION

PATENT NO.     : 6,253,124 B1
DATED          : June 26, 2001
INVENTOR(S)    : Edward A. Belbruno It is certified that error appears in the above-identified patent and that said Letters Patent is hereby corrected as shown below:

<u>Title page,</u>
Under the Related U.S. Application Data item [63] delete "Feb." and insert -- April --

Signed and Sealed this

Eleventh Day of December, 2001

Attest:

*Attesting Officer*

NICHOLAS P. GODICI
*Acting Director of the United States Patent and Trademark Office*